United States Patent [19]
Brkovic et al.

[11] Patent Number: 5,642,267
[45] Date of Patent: Jun. 24, 1997

[54] SINGLE-STAGE, UNITY POWER FACTOR SWITCHING CONVERTER WITH VOLTAGE BIDIRECTIONAL SWITCH AND FAST OUTPUT REGULATION

[75] Inventors: Milivoje S. Brkovic, Plano, Tex.; Slobodan Cuk, Laguna Hills, Calif.

[73] Assignee: California Institute of Technology, Pasadena, Calif.

[21] Appl. No.: 587,032

[22] Filed: Jan. 16, 1996

[51] Int. Cl.⁶ .......................... H02M 3/335; G05F 1/613; G05F 3/16; G05F 1/44
[52] U.S. Cl. .................. 363/16; 323/224; 323/286
[58] Field of Search .................. 363/16, 39, 41, 363/89, 124; 323/222, 224, 266, 271, 282, 284, 285, 286, 288

[56] References Cited

U.S. PATENT DOCUMENTS

| | | | |
|---|---|---|---|
| 4,184,197 | 1/1980 | Cuk et al. | 363/16 |
| 4,257,087 | 3/1981 | Cuk | 363/16 |
| 5,442,539 | 8/1995 | Cuk et al. | 363/16 |

OTHER PUBLICATIONS

Brkovic, M. and Cuk, S., "Automatic Current Shaper With Fast Output Regulation and Soft-Switching," IEEE International Telecommunication Energy Conference Proc., pp. 379-386, (1993).

Jovanovic, M.M., Tsang, Dan M.C., and Lee, F.C., "Reduction of Voltage Stress in Integrated High-Quality Rectifier-Regulators by Variable-Frequency Control," IEEE App. Power Electronics Conf. Proc., pp. 569-575 (1994).

Tedder, Robert M., "Limitations of the Magamp Regulator and an Improved Magamp Choke Design Procedure," IEEE App. Power Electronics Conf. Proc., pp. 109-117, (1988).

Dixon, L.H., Jr., "High Power Factor Preregulators for Off-Line Power Supplies," Unitrode Power Supply Design Seminar SEM-800, pp. 12.1-16.

Madigan, M., Erickson, R. and Ismail, E. "Integrated High Quality Rectifier-Regulators," IEEE Power Electronics Specialists Conference Proc., pp. 1043-1050, (1992).

Primary Examiner—Peter S. Wong
Assistant Examiner—Bao Q. Vu
Attorney, Agent, or Firm—A. M. Fernandez

[57] ABSTRACT

Ac-to-dc switching converters employ bidirectional voltage switches, preferably magnetic amplifiers in series with a fast recovery diode, as controllable series input switches that couple ac rectifiers to single-stage dc-to-dc converters in order to provide unity power factor operation by control of current through the input inductor achieved by modulating the duty ratio d1 of the bidirectional voltage switch while independent regulation of load voltage is maintained by voltage feedback to modulate the switch duty ratio d of the converter (where d1<d) in an independent fast output regulation loop.

18 Claims, 21 Drawing Sheets

SINGLE-STAGE, UNITY POWER FACTOR SWITCHING CONVERTER WITH VOLTAGE BIDIRECTIONAL SWITCH AND FAST OUTPUT REGULATION

FIELD OF THE INVENTION

The invention relates to ac-to-dc switching converters, and more particularly to a new technique of employing a voltage bidirectional switch as the controllable switch, such as a magnetic amplifier switch, to provide both unity power factor and independent output voltage regulation in a single conversion stage.

BACKGROUND OF THE INVENTION

Recent international regulations governing the power quality and harmonic current pollution of the utility by users placed an increased emphasis on the problem of the interfacing electronic loads to the utility line via power circuits. By using an ac rectifier and a dc-to-dc converter for active input current shaping, it is possible to achieve unity power factor (UPF) operation out of such a dc-to-dc converter while providing regulated voltage to a load. Low frequency energy required for input-output power balance is usually stored externally in an output capacitor connected across the load. The main drawback of the input current shaper comprising the dc-to-dc converter with external energy storage is low bandwidth of the output voltage regulation limited to a few hertz. This is a consequence of the need to have a large size external output capacitor and having a single control in the dc-to-dc converter which cannot simultaneously provide both input current shaping and fast output regulation.

One known solution for achieving unity power factor operation in addition to wide bandwidth regulation of the output voltage to a load RL is shown in FIG. 1. The technique is to use a dc-to-dc converter 10, such as a forward, flyback, Cuk or Sepic converter, for output voltage regulation with an additional front-end switching regulator 11 for input current shaping, usually a boost converter coupled to an ac source 12, typically a public utility line, by a fullwave rectifier and lowpass filter 13. Low frequency energy is stored in a capacitor C1 between the two regulators. Galvanic isolation and fast output regulation are then provided by the down-stream dc-to-dc switching converter 10. This solution has several serious drawbacks: (a) power is processed twice, thus leading to lower overall conversion efficiency, (b) the complexity of such a UPF switching converter is increased and (c) both size and cost are increased.

Another class of converters combines input current shaping and fast output regulation and galvanic isolation as described in M. Madigan, R. Ericson and E. Ismail, "Integrated High Quality Rectifier-Regulators," *IEEE Power Electronics Specialists Conference Proc.*, (1992), pp. 1043–1050; M. Brkovic and S. Cuk, "Automatic Current Shaper with Fast Output Regulation and Soft Switching," *IEEE International Telecommunication Energy Conference Proc.*, pp. 379–378, (1993); and M. M. Jovanovic, D. M. C. Tsang and F. C. Lee, "Reduction of Voltage Stress in Integrated High-Quality Rectifier-Regulators by Variable-Frequency Control," *IEEE Applied Power Electronics Conference Proc.*, pp. 569–575, (1994). Such automatic input current shaping with fast output regulation is shown in FIG. 2 using a Cuk converter 20 with an isolation transformer T1. A timing diagram for the operation of the converter of FIG. 2 is shown in FIG. 3. By inserting a fast diode D1 in series with an input inductor L1 of the converter 20, the inductors L1 and L2 are decoupled and a new mode of operation becomes possible. The input boost-like stage of the converter 20 comprising the inductor L1, capacitor C1 and switch Q1 is operated in a discontinuous inductor current mode (DICM), while the output buck-like stage comprising a capacitor C2, inductor L2, a diode switch D2 and a capacitor C0 is operated in a continuous conduction mode (CCM). The switch Q1 is turned ON at the beginning of a constant switching period Ts and turned OFF at the end of interval dTs, where d is duty ratio of the switch Q1 with a drive signal DRQ1 of the waveform A in FIG. 3. The diode D1 switches on automatically as the switch Q1 is switched OFF by a drive pulse DRQ1 of the waveform A in FIG. 3 at the end of the dTs. As a consequence of that new mode of operation, the voltage on the energy storage capacitor C1 is no longer uniquely determined by the input voltage to the converter 20 with the diode D1 in series and the output voltage $V_o$ to a load RL, That voltage on the capacitor C1 can be a dc voltage regardless of the input voltage waveform to the converter 20. Low-frequency energy is thus stored internally in the capacitor C1, which allows automatic current shaping and fast output voltage regulation with a single switch Q1. By keeping the interval dTs constant, which means duty ratio d constant, during a half of the line period, input current shaping is provided automatically.

The capacitor C1 of the input boost-like stage is chosen large enough to attenuate low frequency ripple component at twice the line frequency and thus provide a near constant dc voltage source for the output buck-like stage operated in CCM. Fast output regulation may then be provided by a duty ratio d for the switch Q1 that is almost constant. Variation of the duty ratio d is only required to compensate for voltage drop in parasitic resistances and provide fast output regulation. If the output buck-like stage were operated in DICM instead of in CCM, then variation in the duty ratio d would become significant for a wide range of lead changes. For instance, consider that for a step load change, the duty ratio d is also changed. Consequently, the input current waveform will change due to variation in the duty ratio d and would be distorted. That is not the case when the output buck-like stage operates in CCM because even for a no lead to full load change the duty ratio d will remain almost constant. As a consequence, the input current waveform will not be distorted.

The main disadvantage of the ac-to-dc converter in FIG. 2 and other converters described by M. Madigan, R. Ericson and E. Ismail, "Integrated High Quality Rectifier-Regulators," *IEEE Power Electronics Specialists Conference Proc.*, (1988), pp. 334–340, is lead dependence of the voltage on the energy storage capacitor C1. This voltage is independent of the duty ratio d of the switch Q1 and therefore, cannot be controlled by the duty ratio of the switch Q1. In order to keep this voltage at an acceptable level so as to keep voltage stress on the switch Q1, diode switch D2 and capacitor C1 within an acceptable range, variable switching frequency control must be used in addition to modulation of the duty ratio d as described by M. Brkovic and S. Cuk, "Automatic Current Shaper with Fast Output Regulation and Soft Switching," *IEEE International Telecommunication Energy Conference Proc.*, (1993), pp. 379–378; and M. M. Jovanovic, D. M. C. Tsang and F. C. Lee, "Reduction of Voltage Stress in Integrated High-Quality Rectifier-Regulators by Variable-Frequency Control," *IEEE Applied Power Electronics Conference Proc.*, (1993), pp. 569–575. In order to accommodate variations in the load current from 5% to 100% and line voltage in a range of 80 Vrms to 270 Vrms, the switching frequency must be varied by a factor in a range from 1 to 40. Such a wide range of the switching frequency is unacceptable in practice since the implementation of the circuit at frequencies above a few hundred kHz would be extremely complex and inefficient due to circuit parasitics, mainly leakage inductance of the isolation transformer T1. Therefore, there is a strong trade-off between the voltage stress on the energy storage capacitor C1 and the switching frequency range of the control for the switch Q1. The variation in the switching frequency can be reduced if the voltage on the energy storage capacitor C1 is allowed to vary between its minimum value (which occurs at maximum load and minimum input voltage) and maximum value (which occurs at minimum load and maximum input voltage). While this approach reduces voltage stress on the capacitor C1 and switches Q1 and D1, it has negative impact on the size selected for the capacitor C1. It also requires a high current and high voltage rating for the capacitor C1.

There are three parameters which have to be taken into account in selecting the size of the energy storage capacitor C1: (a) voltage rating, (b) r.m.s. current rating and (c) minimum capacitance. The minimum voltage on the energy storage capacitor C1 is limited by the desired harmonic distortion in the input current waveform. If, for example, the sum of the voltage on the energy storage capacitor C1 and reflected output voltage $NV_O$, which appears as the output voltage of the input boost-like stage of the converter, is kept 25% higher than the peak line voltage, the total harmonic distortion in the line current will be about 30%. At high line voltage 270 Vrms, the minimum voltage is in a range of 500 V. On the other hand, at full load and minimum line voltage 80 Vrms, the sum of the two voltages will be in a range of 150 V, as explained by M. M. Jovanovic et al., *"IEEE Applied Power Electronics Conference Proc.,"* (1993), supra.

The second parameter related to the choice of the energy storage capacitor C1 is its maximum low-frequency r.m.s. which is a combination of the low-frequency current at twice the line frequency and high-frequency current at switching frequency. The current stress in the capacitor is inversely proportional to its voltage for a given load. Consequently, the maximum current stress in the capacitor C1 is determined by the minimum line voltage with a full load condition. The current rating for an aluminum electrolytic capacitor, which is typically used for energy storage, is proportional to its capacitance.

The third parameter is minimum capacitance required to provide sufficient hold-up time. The capacitive energy storage is efficient in terms of energy density when storing energy at relatively high voltages, so significant reduction in volume of the energy storage capacitor and size of the overall power stage can be achieved.

It is thus clear that the prior-art converter of FIG. 2 and other converters described by M. Madigan et al., *IEEE Power Electronics Specialists Conference Proc.,* (1988), supra, have in addition to variable frequency control and high voltage stress on the components, a very serious drawback which is increased size and volume of the energy storage capacitor C1 as compared to the corresponding capacitor C1 of the prior art shown in FIG. 1. The converter of FIG. 2 requires a high voltage capacitor with high current rating and large capacitance which definitely does not allow reduction in its overall size as compared to the storage capacitor C1 between the two stages 10 and 11 of the converter in FIG. 1. In addition, large variation in the storage capacitor voltage does not allow optimum design of the isolation transformer T1 or the output stage of the converter 20 in FIG. 2. Therefore, the serious drawbacks of the prior-art UPF switching converter of FIG. 2 with fast output regulation are: (a) increased voltage stress on the active and passive components, (b) need for variable switching frequency operation and (c) an oversized energy storage capacitor.

STATEMENT OF THE INVENTION

An object of the present invention is to provide a new and improved light weight, efficient and cost-effective processing of ac electrical power with unity power factor and independent dc output voltage regulation at constant switching frequency in a single conversion stage.

Another object of the invention is to provide an isolated single power stage switching dc-to-dc converter with both unity power factor and fast output voltage regulation.

Yet another object is to eliminate the need for an additional active switching element for input current shaping and slow regulation of voltage on an energy transfer capacitor of the single power stage dc-to-dc converter.

A further object is to provide constant switching frequency operation over a wide load range from no load to rated load, and over a wide range of ac input voltage.

Yet another object is to keep voltage stress of the components in the present invention at a minimum over a wide load range from no load to rated load and wide range of the ac input voltage.

And another object is to minimize the capacitance and volume of the energy storage capacitor in the present invention.

In accordance with the present invention, these and other objects of the invention are achieved in a single-stage, near unity-power-factor switching converter comprising a full-bridge rectifier and lowpass filter supplying rectified line voltage to a voltage bidirectional switch S1 in series with a fast diode D1 and an input inductor L1 of a single-stage switching converter. The single-stage converter has a low-frequency energy storage capacitor C1 and at least one active switch Q1 and one passive switch D2 alternately switched on at a constant switching period Ts for periodically charging the storage capacitor through the voltage bidirectional switch S1, input inductor L1 and the passive switch D2, and discharging it through an output inductor L2 and the active switch Q1 as the active and passive switches are alternately turned ON and OFF out of phase with duty-ratio modulation of the active switch for regulation of output voltage to the load through a feedback loop which compares the output voltage with a reference. Thus, the passive switch D1 is automatically turned ON when the active switch is turned OFF to charge the storage capacitor and OFF when the active switch is ON to discharge the storage capacitor into the load having an output capacitor C0 in parallel. Current charging the internal storage capacitor C1 is controlled by the voltage bidirectional switch in series with the input inductor through a voltage feedback loop which compares voltage VC1 on the energy storage capacitor C1 with a reference and regulates charging current into the capacitor C1.

Input current from the full-bridge rectifier is further controlled by the voltage bidirectional switch to follow the voltage at the output of the full-bridge rectifier, either by operating the voltage bidirectional switch S1 at the constant duty ratio during half of the line period or by sensing the input current from the full-bridge rectifier and comparing it with a reference for current feedback control of the voltage bidirectional switch in shaping input current from the full-bridge rectifier to follow the voltage at the output of the full-bridge rectifier. Turn ON of this voltage bidirectional switch is delayed in respect to the turn ON of the converter active switch by a time $\theta_B < dTs$ where, d is the duty ratio of the converter's active switch, while the voltage bidirectional switch is turned OFF at the end of the switching period Ts, just before the converter's active switch Q1 is turned ON. The active switch conducts only current from the storage capacitor until the period $\theta_B$ expires, at which time the voltage bidirectional switch S1 is turned on and current begins to flow in the input inductor L1 of the converter and rises linearly until the end of the interval dTs when the active switch is turned OFF and the passive diode switch is turned ON automatically by becoming forward biased to conduct until the active switch is again turned ON at which time the diode D2 is turned OFF, thus providing fast control of output voltage through the active switch Q1 and passive diode switch D2, while the voltage bidirectional switch S1 provides input current shaping and slow regulation of voltage VC1 on the energy storage capacitor to keep voltage stress of the switches and volume of the energy storage capacitor a minimum over a wide range of the load and of the ac input voltage from the utility line while for converter operation with fast voltage regulation and unity power factor using only this single power stage switching converter operating at constant switching frequency The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
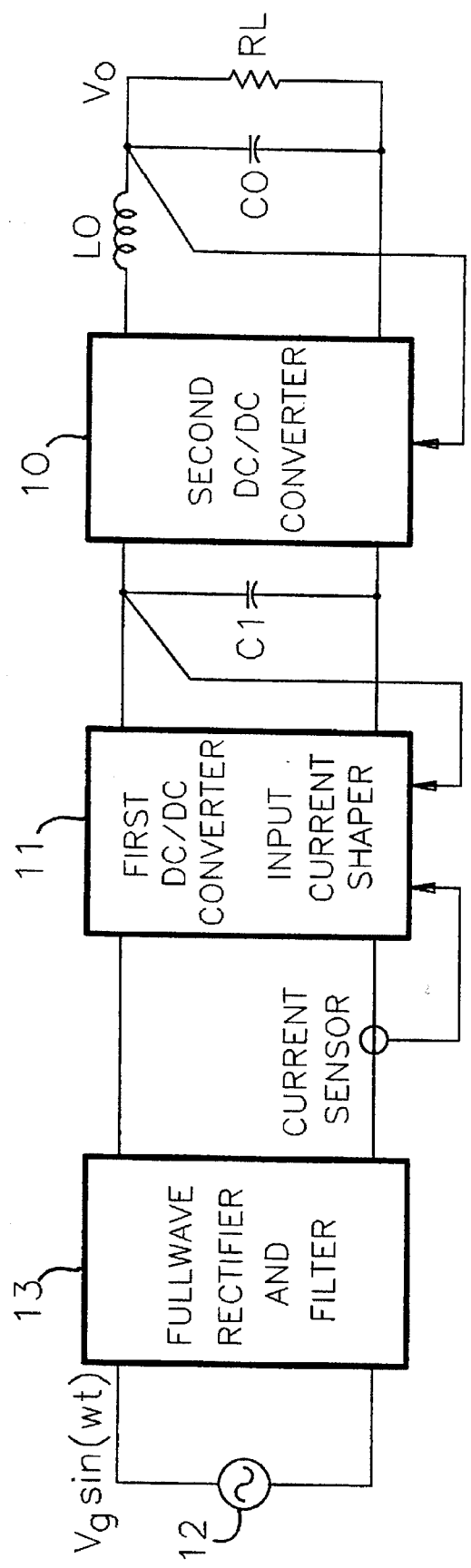
FIG. 1 is a schematic diagram of two cascaded power conversion stages required in the prior art for input current shaping and fast output voltage regulation.
Figure 2:
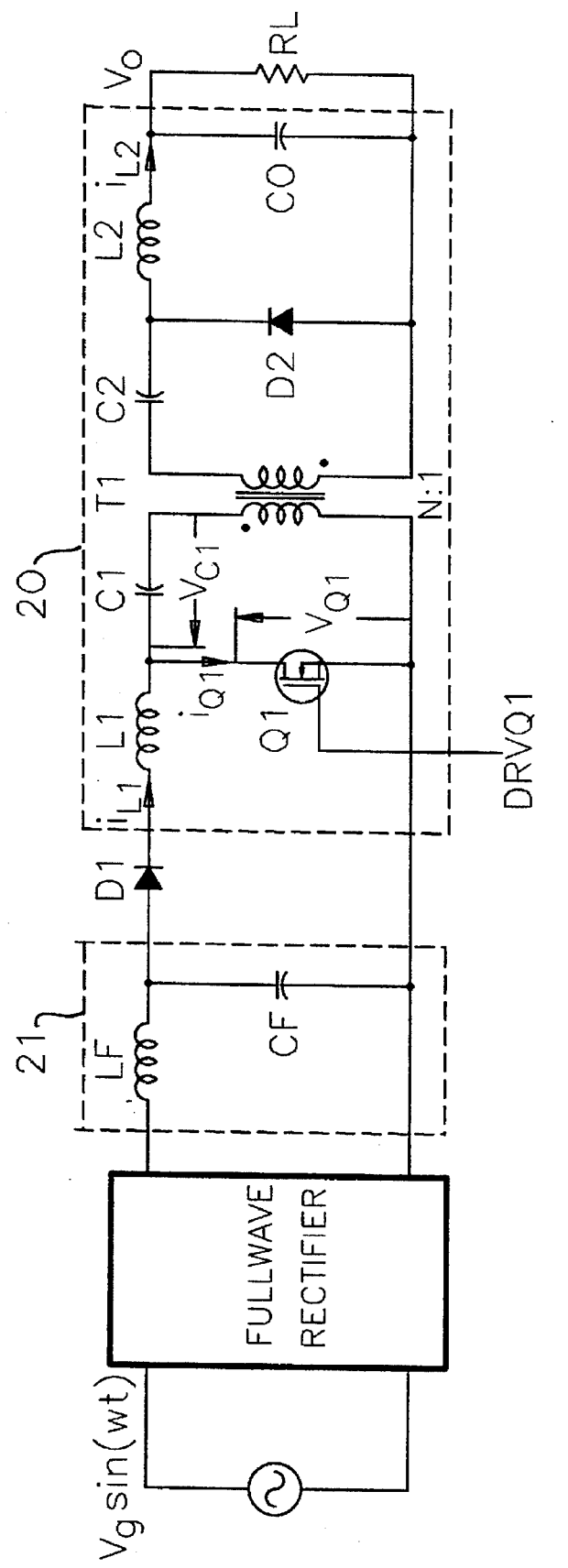
FIG. 2 is a schematic diagram of a prior-art, single-stage, automatic current shaper and dc-to-dc converter with fast output regulation using a Cuk converter with an isolation transformer.
Figure 3:
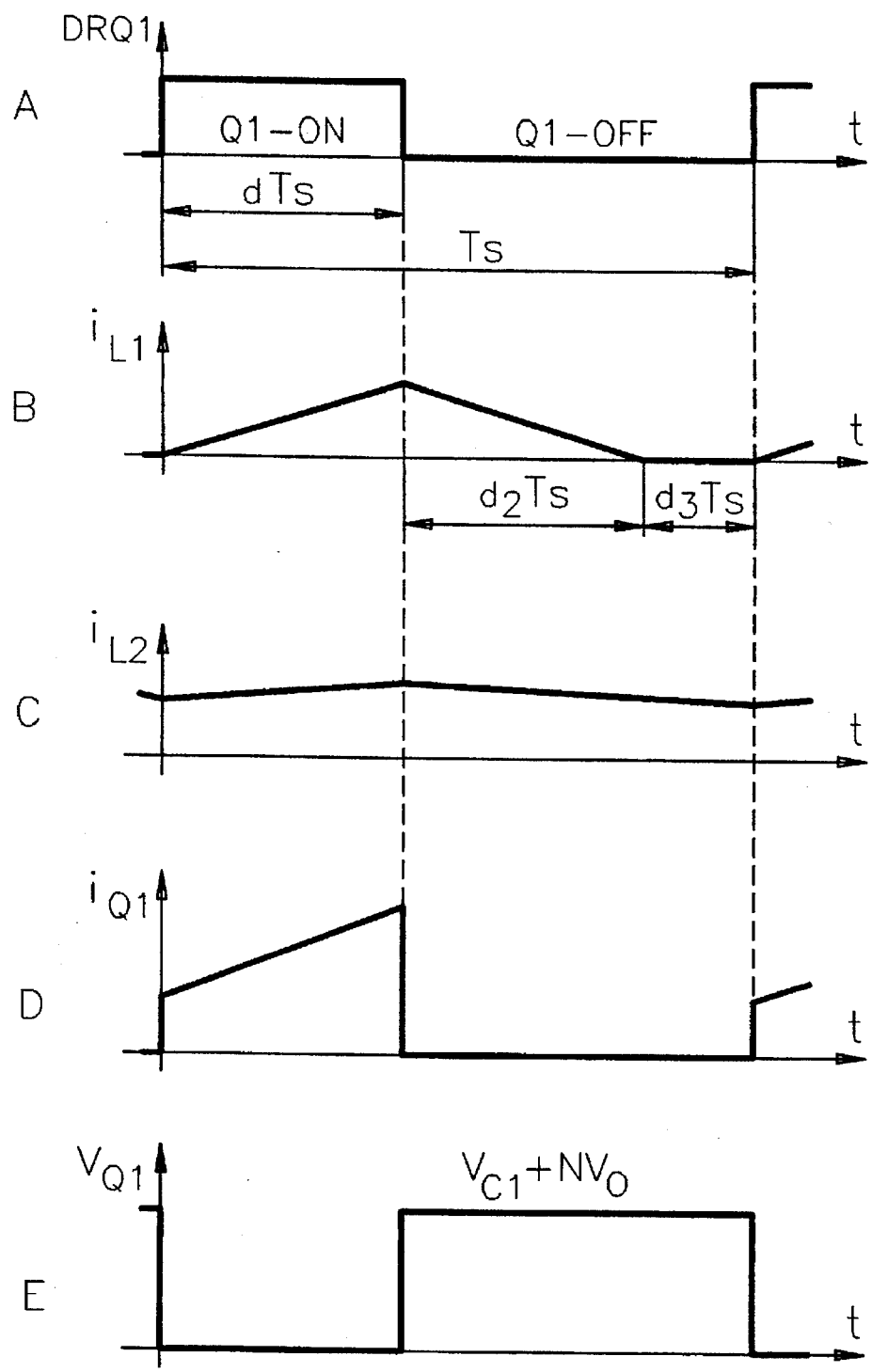
FIG. 3 is a timing diagram for operation of the prior-art circuit of FIG. 2.
Figure 4:
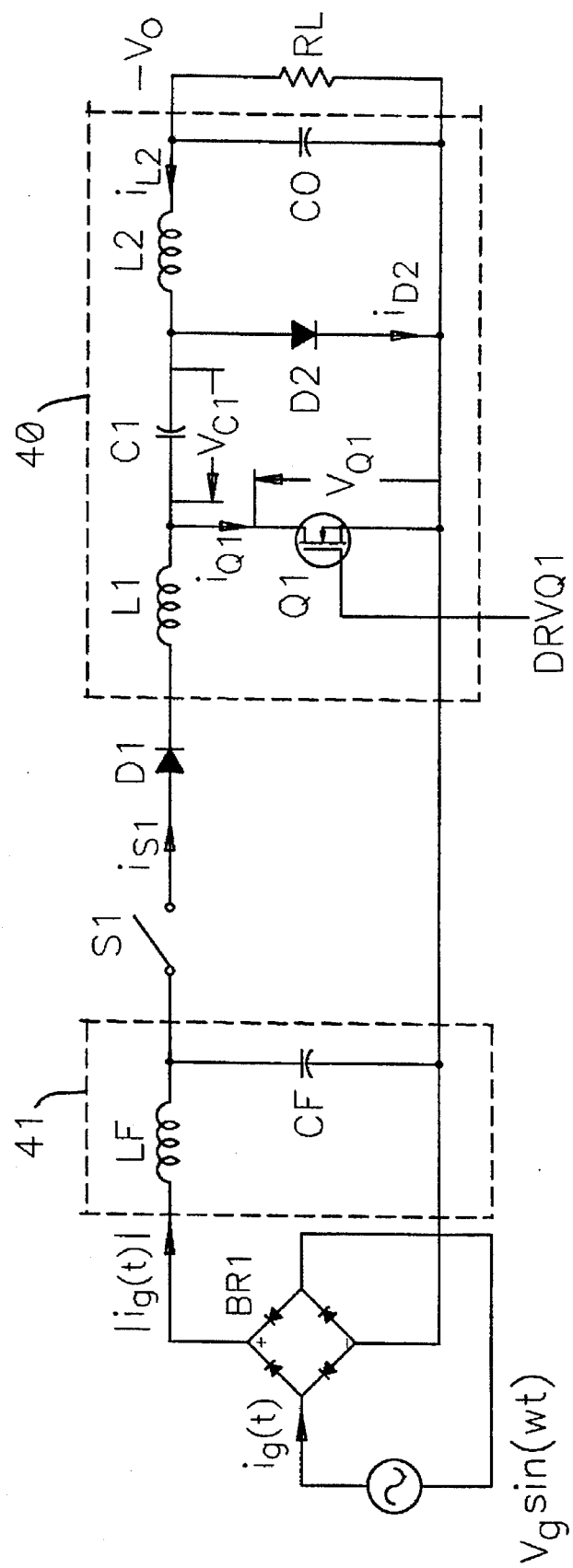
FIG. 4 is a schematic diagram of the present invention using a basic dc-to-dc Cuk converter with a voltage bidirectional switch comprising an ideal switch S1 and series diode D1 in series with an input inductor L1 of the dc-to-dc converter.
Figure 5:
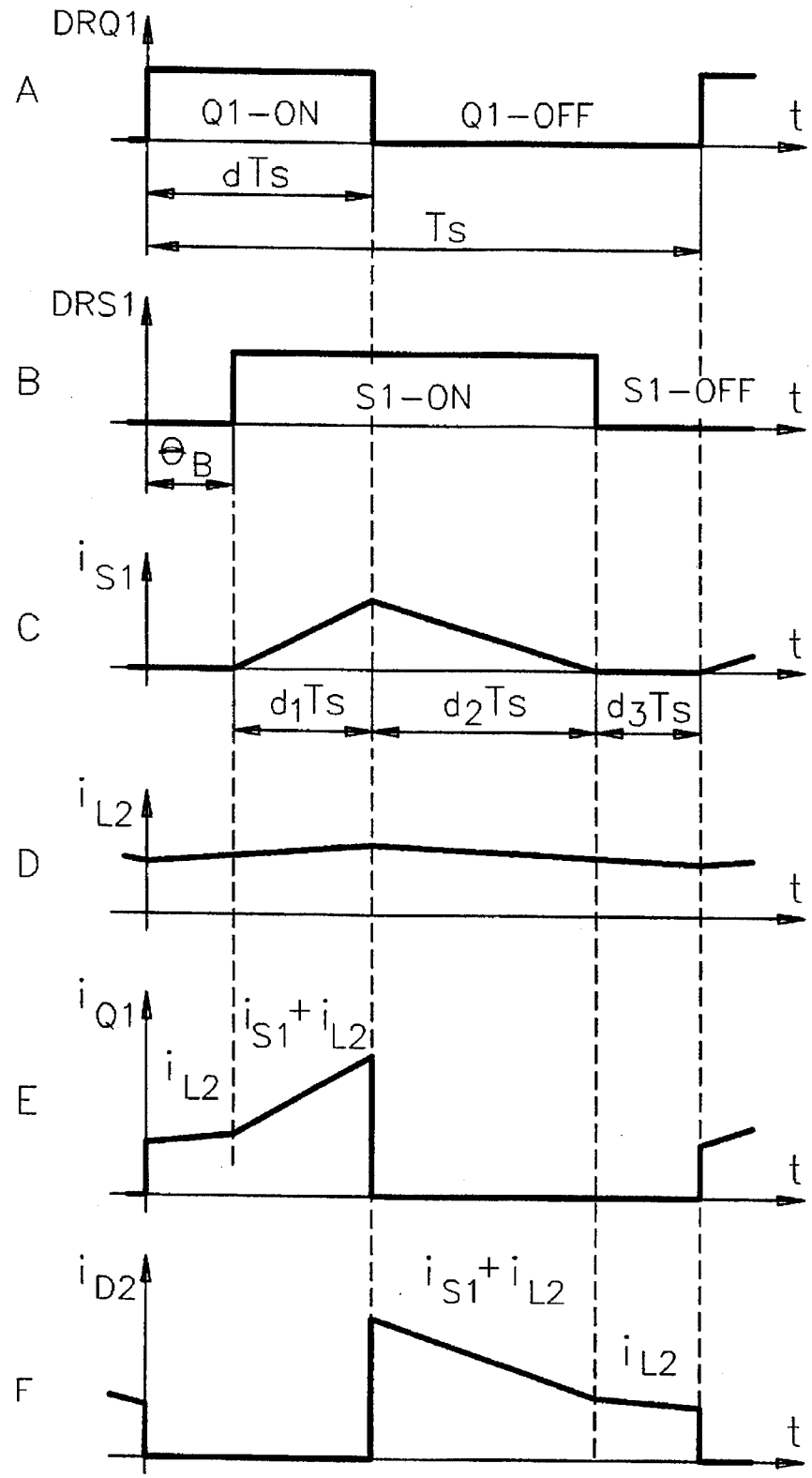
FIG. 5 is a timing diagram for operation of the circuit of FIG. 4 showing the drive signal waveform A for a converter switch Q1, the drive signal waveform B for a voltage bidirectional switch S1, a voltage bidirectional switch current waveform C, an output inductor current waveform D, a main converter switch current waveform E, and a diode switch current waveform F.

Referring to FIG. 4 which illustrates one of a number of preferred embodiments, utilizing a single-stage ac-to-dc converter comprising a basic nonisolated dc-to-dc Cuk converter 40 coupled to a full-bridge rectifier BR1 and lowpass filter 41 with a voltage bidirectional switch, comprising a switch S1, such as a MOSFET device, and fast recovery semiconductor diode D1, connected in series to an input inductor L1 of the Cuk converter 40. The controlled voltage bidirectional switch provides input current shaping and voltage regulation on the energy storage capacitor C1 independently of fast output voltage regulation provided by control of the main switch Q1. The low frequency energy is stored in a storage capacitor C1 (sometimes referred to as an energy transfer capacitor) of the converter 40. A timing diagram of the circuit is shown in FIG. 5. The main switch Q1 is driven at a constant repetition time Ts and duty ratio d as shown in waveform A. Turning on the switch S1 is delayed an interval $\theta_B$ in respect to the instant the main switch Q1 is turned on as shown in waveform B. During the interval $\theta_B$, the diode D2 is reverse biased by the voltage $V_{C1}$ of the transferring capacitor C1, the input current $i_{S1}$ shown in waveform C is zero, and the main switch Q1 conducts only the current of the output inductor $i_{L2}$ as shown in waveform E. During the time of simultaneous conduction of the main switch Q1 and the switch S1, denoted as the interval $d_1Ts$ in waveform C, input current $i_{S1}$ rises linearly to a peak from an initial value of zero to its peak value. The main switch Q1 conducts the sum of input current $i_{S1}$ and output inductor current $I_{L2}$, as shown in waveform E. At the end of the interval $\theta_B+d_1Ts$, the main switch Q1 is turned off and diode D2 becomes forward biased to conduct the sum of the input current $i_{S1}$ and the output inductor current $i_{L2}$ as shown in waveform F. During the time interval $d_2Ts$ the input current $i_{S1}$ decays linearly from its peak value toward zero. At the end of the time interval $d_2Ts$, the input current $i_{S1}$ terminates because diode D1 becomes reverse biased and the diode D2 carries only the output inductor current $i_{L2}$ in the rest of the switching period (indicated as $d_3Ts$ in waveform C), as shown in waveform E. Since input current $i_{S1}$ is zero during that final interval, the voltage bidirectional switch S1 can be turned off. The result is an output inductor current iL2 to the load RL and parallel capacitor C0 which has a very nearly steady amplitude as shown in waveform D. This maintains a charge on the capacitor C0 at a regulated output voltage $-V_O$.

The input boost-like stage of the converter 40 operates in the discontinuous induction current mode DICM with the duty ratio $d_1$ smaller than the duty ratio d of the main switch Q1. When the duty ratio $d_1$ is kept constant, both automatic input current shaping and regulation of the voltage on the capacitor C1 are provided by the voltage bidirectional switch, comprising the switch S1 and the diode switch D1 at the constant switching frequency. The input stage has a conversion ratio $$M_1 \equiv \frac{V_{C1}}{V_g} = \frac{1+\sqrt{1+\frac{2d_1^2}{K_1 d^2}}}{2} \tag{1}$$

where, $V_g$ is the average dc voltage out of the fullwave rectifier BR1, $V_{C1}$ is the average dc voltage stored in the capacitance C1, $K_1$ is conduction parameter of the input stage given by $$K_1 = \frac{2L1}{RTs} = \frac{2L1}{R} f_S \tag{2}$$

where, $L_1$ is the inductance of the input inductor L1, $T_S$ is the period of the switching frequency $f_S$. When the voltage $V_{C1}$ is preregulated, and the output stage of the converter 40 operates in CCM, the duty ratio d of the main switch Q1 is almost constant regardless of load. Equation (1) shows that the voltage $V_{C1}$ can be regulated by the duty ratio $d_1$ at a constant switching frequency $f_S$. Therefore, the energy storage capacitor C1 has, in first approximation, the same voltage and current stress regardless of the ac input voltage on the utility line.

The conversion ratio of the output stage of the converter in FIG. 4, operating in CCM, is given by $$M_2 \equiv \frac{V_o}{V_{C1}} = d, \tag{4}$$

while the overall conversion ratio of the converter is $$M \equiv \frac{V_o}{V_g} = M_1 M_2 = d \frac{1+\sqrt{1+\frac{2d_1^2}{K_1 d^2}}}{2}. \tag{5}$$

Fast output voltage regulation is provided by controlling the duty ratio d of the main switch Q1.

Input current is, averaged over a switching period Ts is $$\langle i_{S1}(t) \rangle = \langle i_g(t) \rangle = \frac{V_g|\sin(wt)|d_1^2 T_S}{2L1} \frac{M_1}{M_1 - |\sin(wt)|} \tag{6}$$

where, $V_g|\sin(wt)|$ is rectified line voltage with radian frequency w, and can be also controlled by the duty ratio $d_1$.

Figure 6:
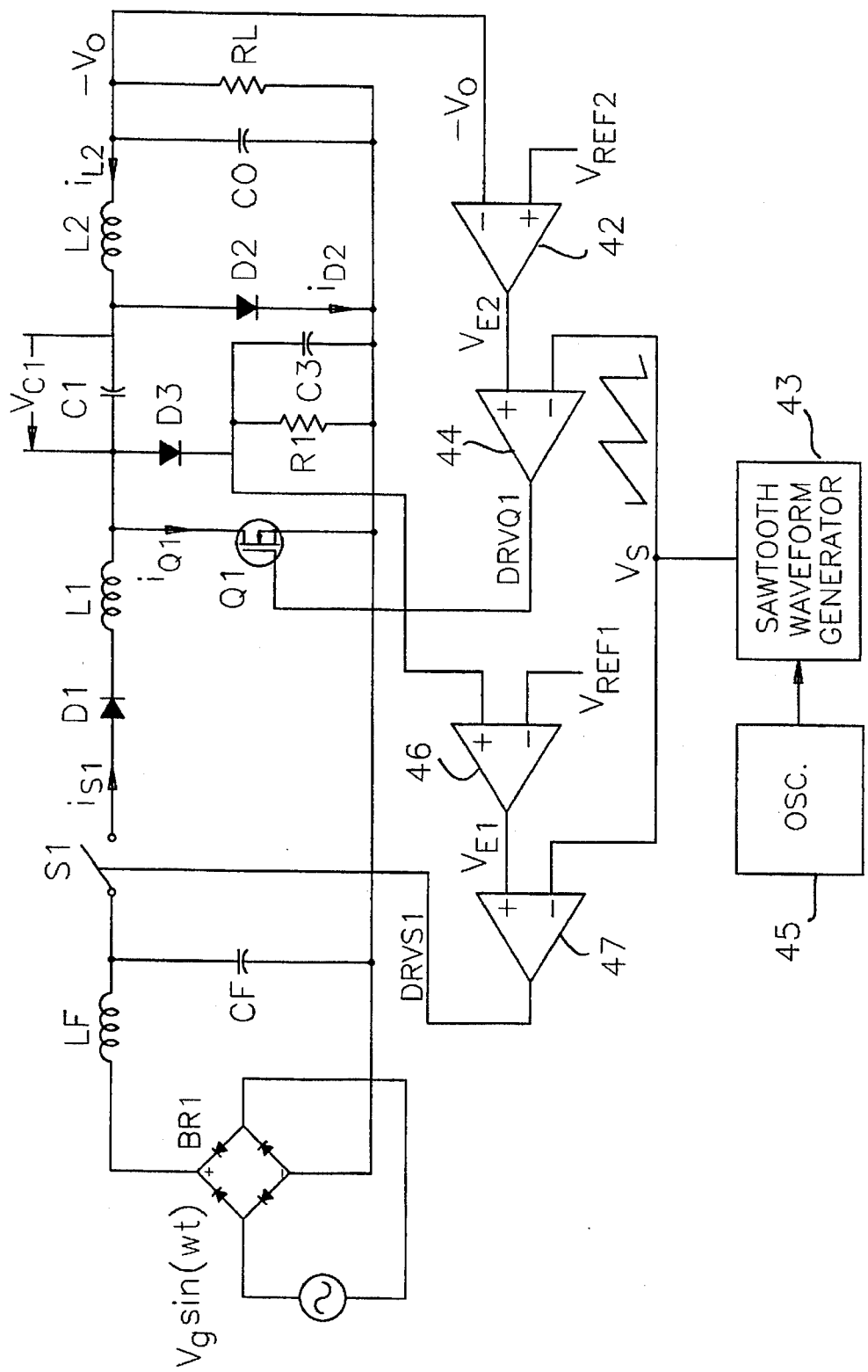
FIG. 6 is a schematic diagram of the ac-to-dc converter of FIG. 4 together with a feedback control circuit for fast output voltage regulation and a feedback control circuit for automatic input current shaping, both using voltage comparison.

There are two approaches for control of the input current. One approach is to keep the duty ratio $d_1$ constant during half of the line period in which case the input inductor current $i_{S1}$ will follow the rectified line voltage automatically. The corresponding schematic of the control circuit for that approach is shown in FIG. 6. The voltage $V_{C1}$ on the energy storage capacitor C1 is sensed using the peak detector circuit comprising a diode D3, capacitor C3 and resistor R1. Capacitor C3 is charged through a diode D3 during the OFF interval of the switch Q1. During the conduction interval of the switch Q1, diode D3 is reverse biased and capacitor C3 is slowly discharged through the resistor R1. The time constant R1C3 is chosen long enough to filter out the switching frequency ripple component on the capacitor C3. The voltage on the capacitor C3 is compared with a reference voltage $V_{REF1}$ in an error amplifier 46. The output voltage $V_{E1}$ of the error amplifier 46 is compared with a sawtooth waveform $v_S(t)$ having the amplitude $V_S$ and period Ts from a generator 43 by a comparator 47 which generates on its output drive signal DRVS1 for the switch S1 (waveform C of FIG. 5). The sawtooth waveform generator is driven by a stable oscillator 45 at a constant frequency. Output voltage $-V_o$ is compared with the reference voltage $V_{REF2}$ in an error amplifier 42 which generates voltage $V_{E2}$ which is compared with a sawtooth waveform $v_S(t)$, having the amplitude $V_S$ and period Ts, from a generator 43 by a comparator 44. The comparator 44 generates the drive signal DRVQ1 (waveform B of FIG. 5) with duty ratio d for the switch Q1. Thus, the duty ratio d for the main converter switch Q1 is controlled by the feedback loop, comprising error amplifier 42 and comparator 44, for output voltage regulation while the duty ratio $d_1$ of the switch S1 is controlled by a second independent feedback loop comprising error amplifier 46 and comparator 47 to provide input current shaping and thus near unity power factor operation and slow regulation of voltage on the energy transfer capacitor C1 of the single-stage Cuk dc-to-dc converter.

It should be noted that design of the output buck-like stage of the single-stage Cuk converter can be significantly simplified and optimized in the present invention due to preregulated voltage on the energy transferring capacitor C1 because only a small variation in the duty ratio d of the switch Q1 is required to compensate for parasitic resistances for load change. A timing diagram for the control circuit of FIG. 6 is shown during a switching period Ts in FIG. 7. In order to simplify the control circuit, the switch S1 is turned OFF at the end of the switching cycle period Ts just before the switch Q1 is turned on again for the next switching cycle.

Figure 7:
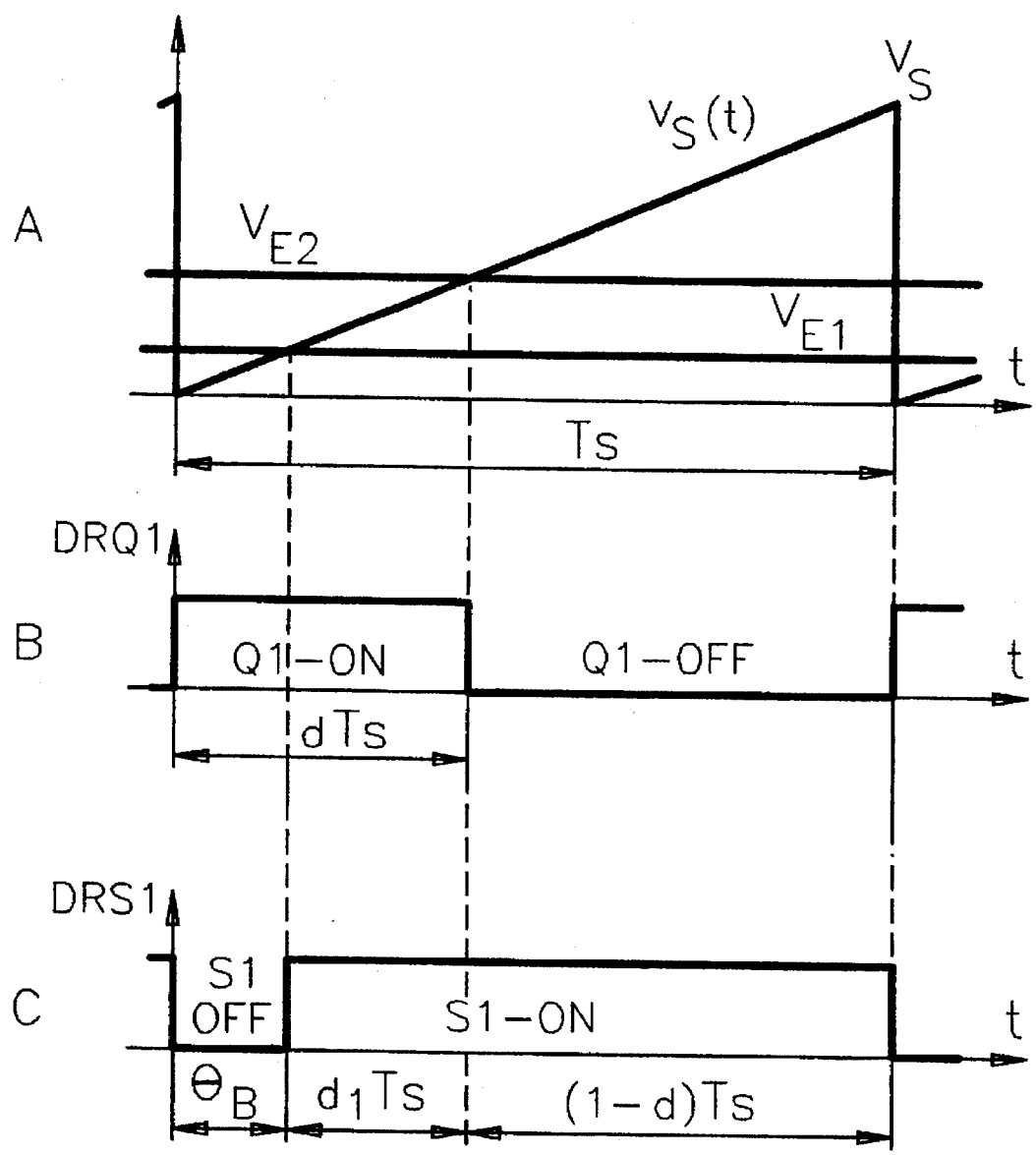
FIG. 7 is a timing diagram for operation of the control circuit of FIG. 6.

The sawtooth waveform $v_S(t)$, (with the amplitude $V_S$) shown in FIG. 7, is compared with the output voltage $V_{E1}$ of the error amplifier 46 and the output voltage $V_{E2}$ of the error amplifier 42. When the sawtooth voltage $v_S(t)$ exceeds voltage $V_{E2}$, the main converter switch Q1 (which is turned ON at the beginning of the switching period Ts) is turned OFF, thus setting the duty ratio d, i.e., setting the interval during each switching cycle for transferring the energy stored in the capacitor C1 to the output capacitor C0 and the load RL in parallel. On the other hand, the switch S1 is turned OFF at the beginning of the switching period and turned ON when the sawtooth voltage $v_S(t)$ exceeds the voltage $V_{E1}$. The switch S1 may be left ON until the start of the next cycle, thus simplifying the control circuit for automatic current shaping and fast output voltage regulation of the single-stage, ac-to-dc conversion of ac power to a regulated dc voltage.

Figure 8:
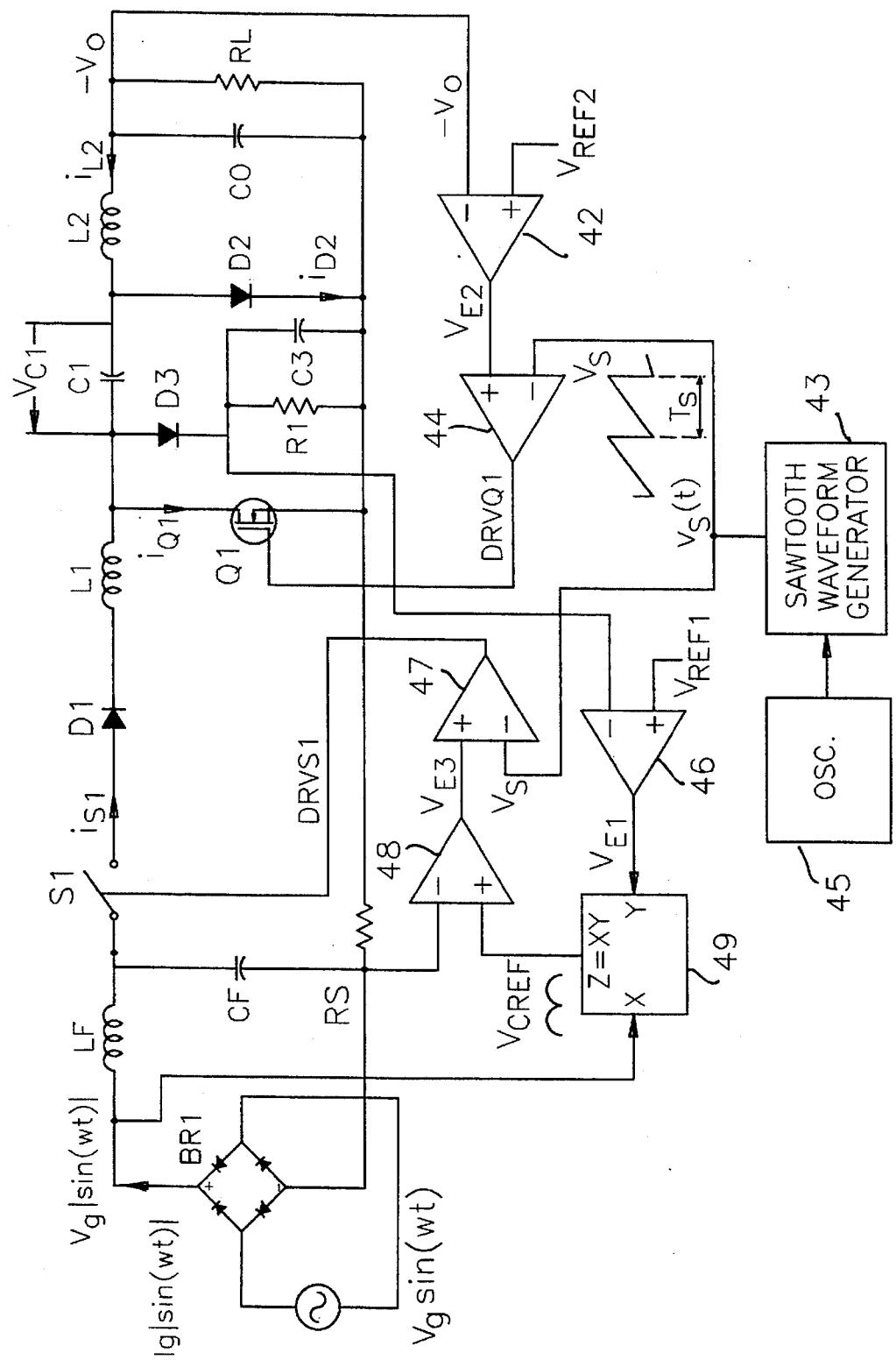
FIG. 8 is a schematic diagram of the ac-to-dc converter of FIG. 4 together with a control circuit for fast output voltage regulation and input current shaping using a voltage multiplier.

The second approach for input current shaping in the present invention is shown in FIG. 8. The main difference from the control circuit of FIG. 6 is that the control circuit for the switch S1 has a fast current loop in addition to the low bandwidth voltage loop shown in FIG. 6 comprising the error amplifier 46 and comparator 47. The control circuit of FIG. 8 requires three additional components compared to the control circuit of FIG. 6: a sense resistor Rs, an error amplifier 48, and a multiplier 49. Output $V_{E1}$ of the error amplifier 46 is multiplied with rectified line voltage $V_g|\sin(\omega t)|$ in the multiplier 49 in order to provide the reference voltage $V_{IREF}$ for the input current. The input current is sensed with resistor RS and voltage on the resistor is compared with the reference voltage $V_{IREF}$ in the error amplifier 48. Output voltage $V_{E3}$ of the amplifier 48 is compared with the sawtooth waveform $v_S(t)$ in the comparator 47, which provides the drive signal DRVS1B for the switch S1. With this approach, very near UPF operation is achieved. The operation of the output voltage regulation loop is unchanged.

From the foregoing description of FIGS. 4 through 8, it is clear that the present invention provides the functions of the input current shaping and fast output regulation in a single-power stage at constant switching frequency with minimized voltage stress on the components and with UPF operation. It may also provide dc isolation of the load from the ac line source.

Figure 9:
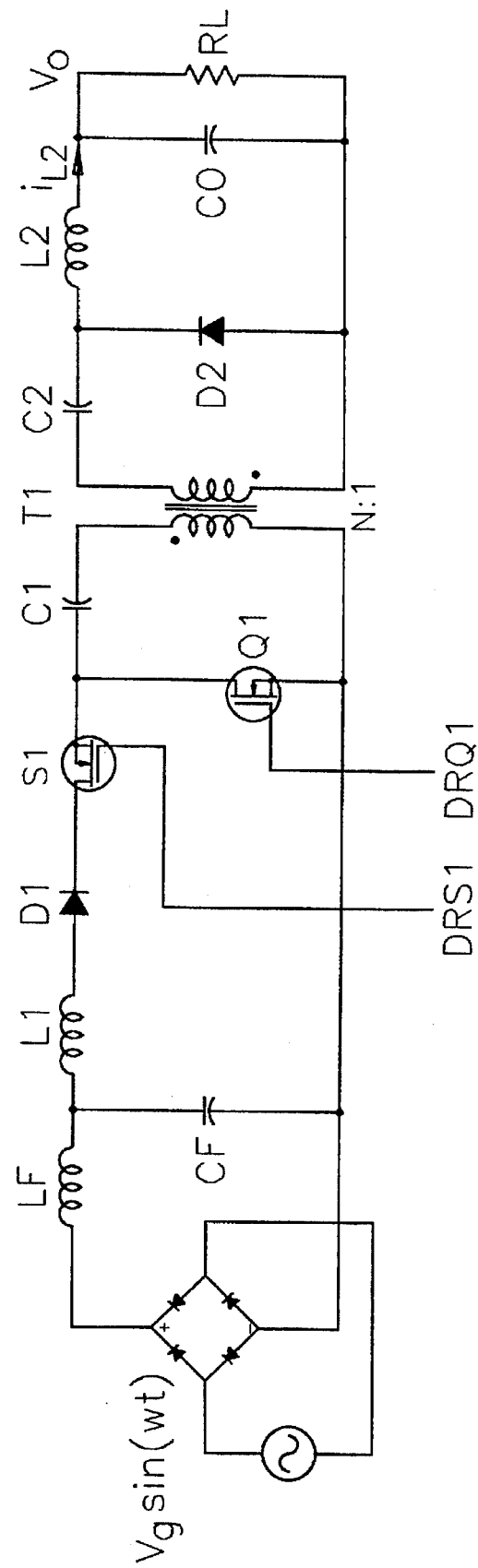
FIG. 9 is a schematic diagram of the ac-to-dc converter of FIG. 4 using an isolated version of the basic dc-to-dc Cuk converter, namely a basic Cuk converter with an isolation transformer between input and output stages and showing a practical realization of the switch S1 with a MOSFET transistor.

In the isolated extension of the present invention shown in FIG. 9, low frequency energy is stored in a primary side energy transfer capacitor C1A while the other reactances in the circuit, namely the secondary side energy transferring capacitor C2, output inductor L2, output capacitor C0 and transformer T1, are all high frequency components designed for the switching frequency.

Figure 10:
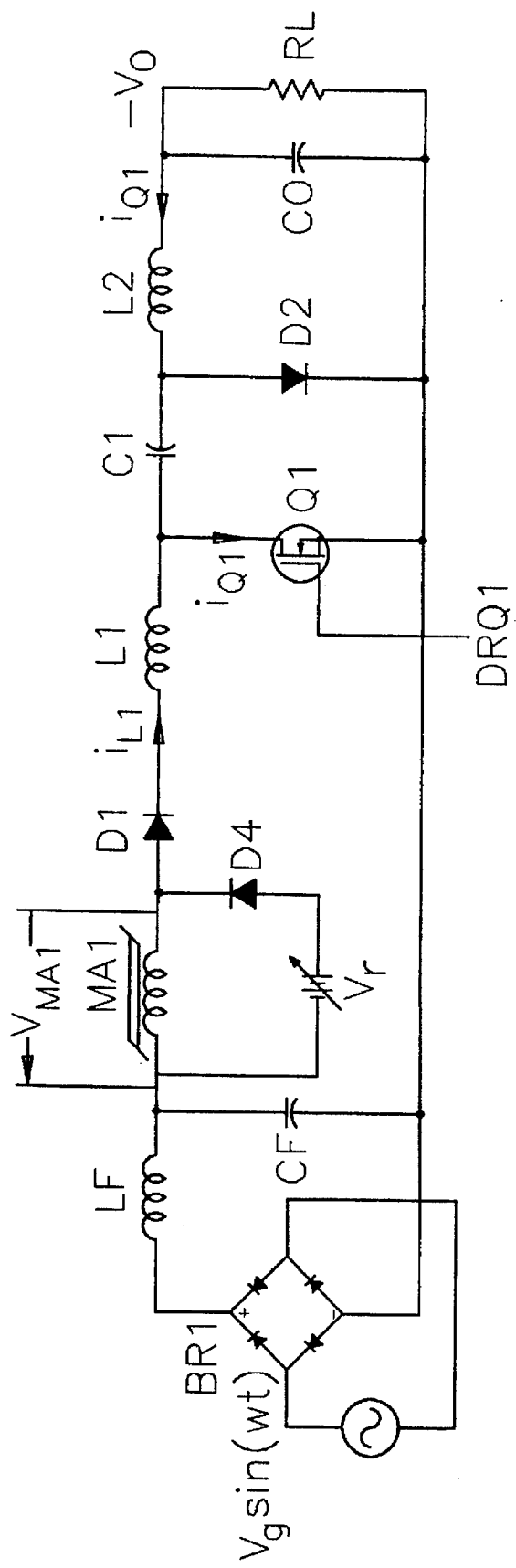
FIG. 10 is a schematic diagram of the ac-to-dc converter of FIG. 4 using a magnetic amplifier with a series diode as a voltage bidirectional switch to be used for input current shaping and slow regulation of the voltage on an energy storage capacitor C1.

The switch S1 can be realized with a semiconductor device, usually a MOSFET transistor as shown in FIG. 9. The main disadvantages of using a MOSFET transistor are a need for isolated drive, overvoltage on the MOSFET switch S1 at turn on of the main switch Q1, turn-on loss due to parasitic capacitance of the MOSFET switch S1 and reverse recovery current in the diode D1, particularly at switching frequencies above 100 kHz. These disadvantages are obviated when the switch S1 of FIG. 4 is implemented instead with a saturable inductor MA1 as shown in FIG. 10. The saturable inductor MA1 and fast diode D1 connected in series form a magnetic amplifier for the circuit which operates as a controllable voltage bidirectional switch.

Figure 11:
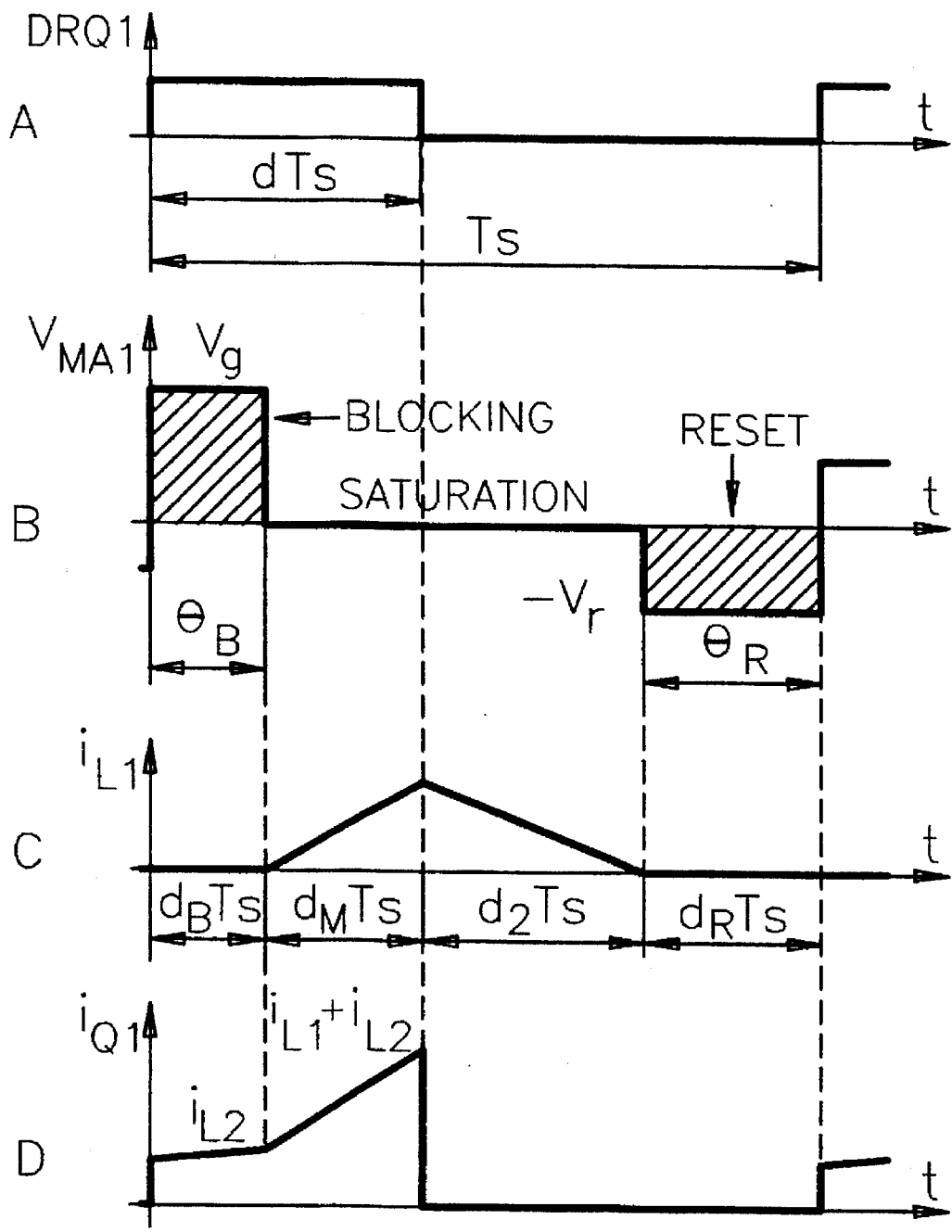
FIG. 11 is a timing diagram of salient waveforms of the circuit of FIG. 10 showing: the drive signal A for the transistor switch Q1, voltage waveform B on the magnetic amplifier MA1, input inductor current C, and transistor current B of the switch Q1.

Salient waveforms for the circuit of FIG. 10 in operation are shown during a switching period in FIG. 11 while the equivalent circuits during four different operating states are shown in FIGS. 12(a)–12(d). For simplicity, the saturable inductor MA1 is represented as a short circuit when it is saturated in FIGS. 12(b) and 12(c) and as an open circuit during its blocking and reset to states shown in FIG. 12(a) and FIG. 12(d), respectively.

Transistor Q1 is driven with drive signal DRVQ1 at constant frequency and the duty ratio d as shown in waveform A of FIG. 11. During the blocking state shown in FIG. 12(a), the saturable inductor MA1 blocks the rectified line voltage $V_g|\sin(\omega t)|$, so the transistor Q1 carries only the reflected output inductor current $i_{L2}$ as shown in waveform D of FIG. 11. The core of the saturable inductor MA1 saturates after the time $\theta_B = d_B Ts$ shown in waveform B of FIG. 11. During the saturation state of the saturable inductor MA1, shown in FIG. 12(b), the input current $i_{L1}$ rises linearly from zero to its peak value during the time $d_M Ts$ as shown in waveform C of FIG. 11.

Figure 12A:
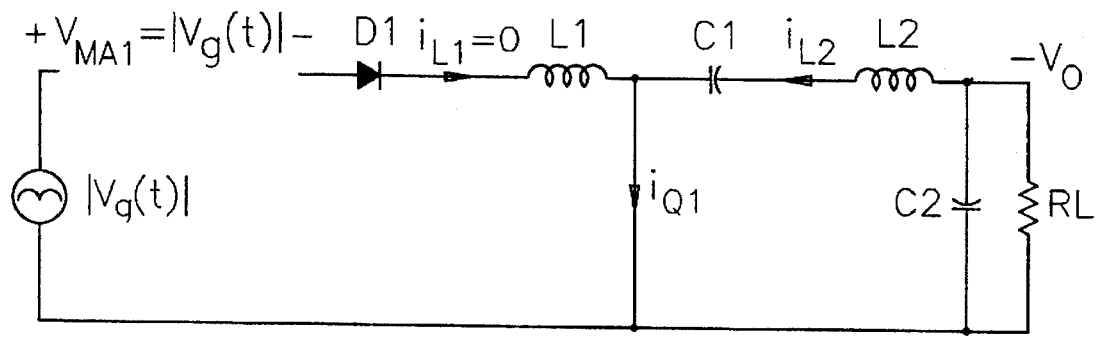
FIGS. 12(a) through 12(d) illustrate schematically equivalent circuits of the circuit shown in FIG. 10 during four different operating states: (a) blocking state of the magnetic amplifier, (b) charging state of the input inductor, (c) discharging state of the input inductor, and (d) reset stage of the magnetic amplifier.
Figure 12B:
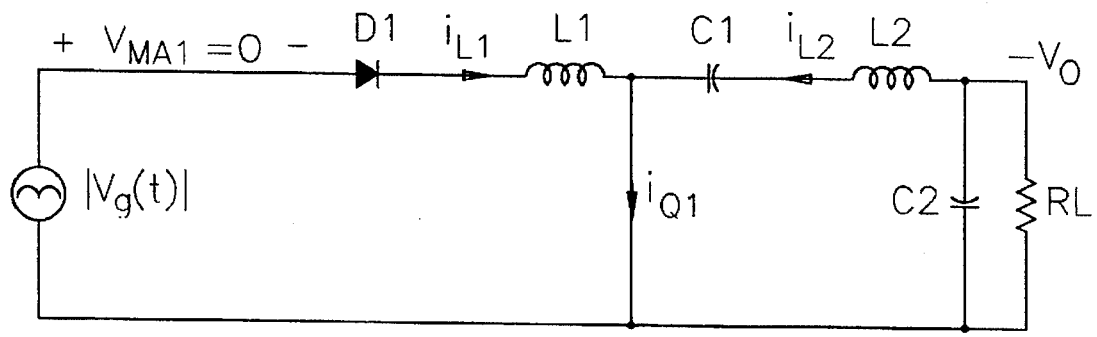
Figure 12C:
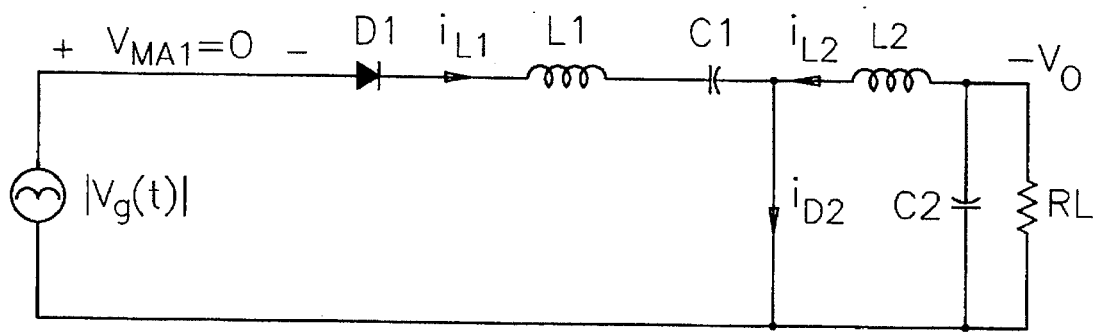

At the instant t=dTs, Q1 is turned off and energy previously stored in the input inductor during the time $d_M Ts$ is discharged into the energy storage capacitor C1 during the time $d_2 Ts$ as shown in FIG. 12(c). The diode D2 conducts the sum of the input and the output inductor currents during this interval.

The saturable inductor MA1 is still in saturation during the interval $d_2 Ts$ and the input inductor current $i_{L1}$ decays linearly toward zero as shown in waveform C of FIG. 11. The diode D1 turns off when the input inductor current reaches zero and the saturable inductor MA1 can be reset during the rest of the switching period, denoted as $d_R Ts$ in waveform C of FIG. 11. The blocking time $\theta_B$ is determined by the volt-seconds stored in the saturable inductor during the reset interval $\theta_R$ as shown in waveform B of FIG. 11. Therefore, the circuit from FIG. 10 provides the same functions as the circuit of FIG. 4.

By control of the blocking state $\theta_B$ of the saturable inductor MA1 in the magnetic amplifier independently from the conduction interval dTs of the main switch Q1, the magnetic amplifier in the circuit of FIG. 10 provides the same functions as the voltage bidirectional switch in FIG. 4 which is shown schematically as an ideal switch S1 in series with the diode D1, namely input current shaping and regulation of the voltage on the energy storage capacitor C1 by controlling the duty ratio $d_M$ of the magamp MA1. In addition, fast output regulation in the same manner by control of the duty ratio d of the main transistor switch Q1. The voltage stress on the switches Q1 and D2 can be at the same level or even less than as in the basic Cuk dc-to-dc converter.

It should be noted that for an isolated version of the ac-to-dc converter of FIG. 10, equivalent to the converter of FIG. 9, the switch S1 in the converter of FIG. 9 is replaced by the saturable inductor MA1, which in series with the diode D1 comprises a magnetic amplifier and a diode D4 and controllable voltage source $V_{RST}$ are added for control of the saturable core.

The limits of the magnetic amplifier which have to be taken into account in the invention will now be discussed. Since the magnetic amplifier is in series with the input inductor L1, it is desirable to have saturated inductance of the saturable inductor as high as possible in order to reduce the size of the input inductor. This is in contrast to the applications in which the magnetic amplifier is used as a post-regulator and saturated inductance limits the maximum effective duty ratio of the magnetic amplifier as explained in R. M. Tedder, "Limits of the magnetic amplifier regulator and an improved magnetic amplifier choke design procedure," *IEEE Applied Power Electronics Conference*

*Proc.*, (1988), pp. 109–117. There are still two undesirable flux reset components caused by reverse recovery current of the series diode D1, and core squareness. The former requires a rather complicated analysis and the final result depends on the diode parameters as well as core material. For simplicity, only core squareness is considered as an undesirable reset component in the following analysis, and it is taken into account through the flux $\Lambda_{SQ}=\Lambda_S-\Lambda_r$ shown in FIG. 13.

Both the automatic current shaping approach of FIG. 6 and the multiplier approach of FIG. 8 are discussed for input current shaping. In order to provide input current shaping automatically, the duty ratio $d_M$ of the magnetic amplifier has to be kept constant during half of the ac line period, regardless of variations in the duty ratio d of the main switch, the switching transistor Q1 of FIG. 10. When the multiplier approach is used, the duty ratio $d_M$ of the magnetic amplifier is determined by the current loop and varies during half of the line period. Regardless of the approaches for input current shaping, both the voltage and current reset of the saturable core in the magnetic amplifier can be used.

Automatic current shaping is considered first and both reset methods are discussed.

The Voltage Reset

Referring to FIG. 11, the duty ratio $d_M$ of the magnetic amplifier is given by:

$$d_M=d-d_R \quad (7)$$

Figure 12D:
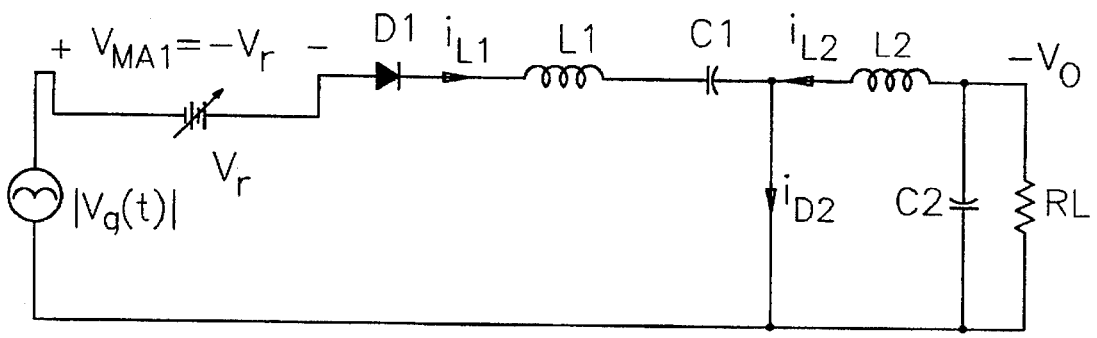

Total volt-seconds stored in the core are given by:

$$\Delta\Lambda_C\Lambda_{SQ}+\Lambda_C=\Lambda_{SQ}+V_cd_RT_s \quad (8)$$

where, $V_r$ is the reset voltage applied on the saturable inductor MA1 during the reset state $d_RTs$ as shown in FIG. 12(d). Equality of the volt-seconds blocked by and the volt-seconds stored in the saturable inductor gives $$V_s(d-d_M)=V_rd_RT_s+\Lambda_{SQ} \quad (9)$$

where, $d_R$ can be expressed as:

$$d_R=(1-d)T_s-\frac{V_g}{V_o-V_g}d_MT_s. \quad (10)$$

By substituting $v_S=V_g\sin(wt)$ and Equation (10) into Equation (9) and solving in $V_r(t)$ the reset voltage required is obtained:

$$V_r(t)=-\frac{\Lambda_{SQ}(M_1-|\sin(wt)|)}{(1-d)(M_1-|\sin(wt)|)-d_M|\sin(wt)|}\frac{(M_1-|\sin(wt)|)(d-d_M)}{(1-d)(M_1-|\sin(wt)|)-d_M|\sin(wt)|} \quad (11)$$

As evident from Equation (11), the voltage reset method requires a very complicated control circuit to obtain the required reset voltage $V_r(t)$. Having also in mind that this control method will not provide unity power factor, it is obvious that automatic current shaping with voltage reset of the magnetic amplifier is not preferable for practical realization.

The Current Reset

Figure 13:
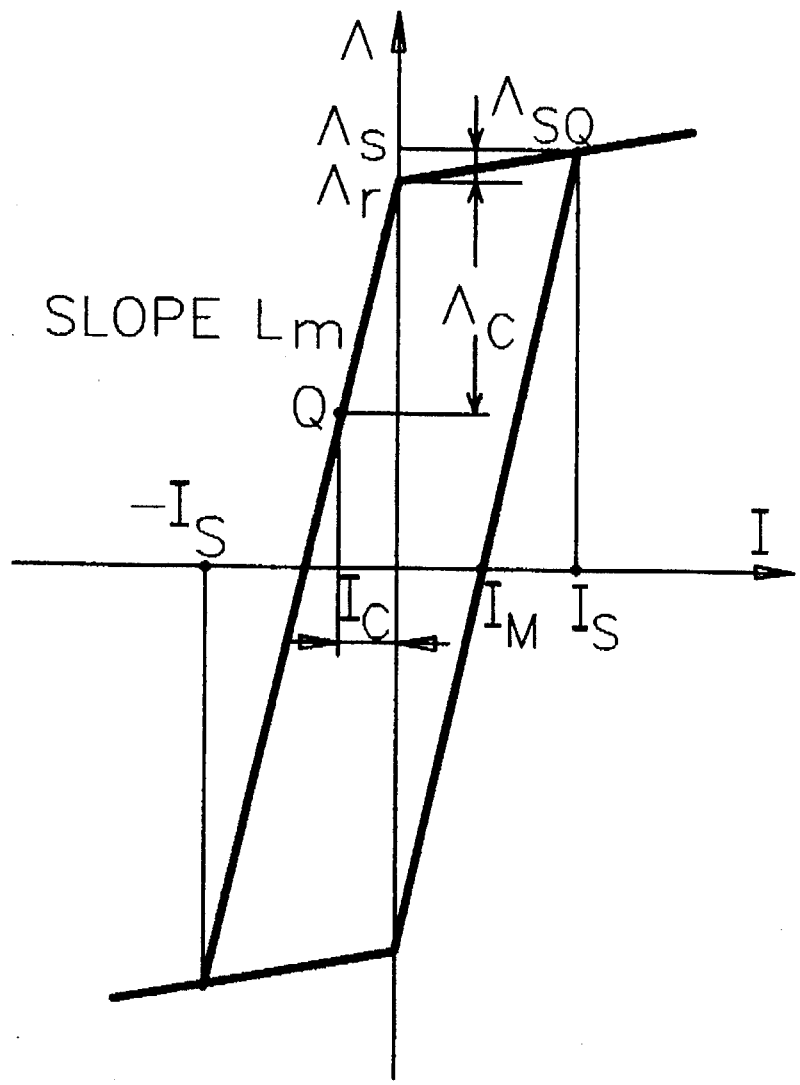
FIG. 13 is a simplified diagram of the $\Lambda$-I characteristic of the saturable inductor used in the magnetic amplifier MA1 with current reset control in the circuit of FIG. 10.

Since the gain of the magnetic amplifier with the current reset depends on the unsaturated inductance of the saturable inductor, the Λ-I characteristic needs to be specified. The second-order parameters of the core, which are not important for the basic principle of the control, are neglected in the following analysis. The simplified Λd characteristic of the saturable inductor used as magnetic amplifier is shown in FIG. 13. It is assumed that unsaturated inductance $L_m$ is constant and inductor MA1 runs out of saturation at zero current i=O, which corresponds to residual flux $\Lambda_r$.

The volt-seconds stored in the magnetic amplifier, $\Lambda_c$, due to control or reset current, $I_c$, are given by:

$$\Lambda_C=LMI_C. \quad (12)$$

By using the expression for $\Lambda_C$ from Equation (12), instead of the expression for the voltage reset from Equation (9), the control current $I_C$ can be written as:

$$I_C(t)=\frac{(d-d_M)T_S}{LM}V_g|\sin(wt)|-\frac{\Lambda_{SQ}}{LM} \quad (13)$$

Figure 14:
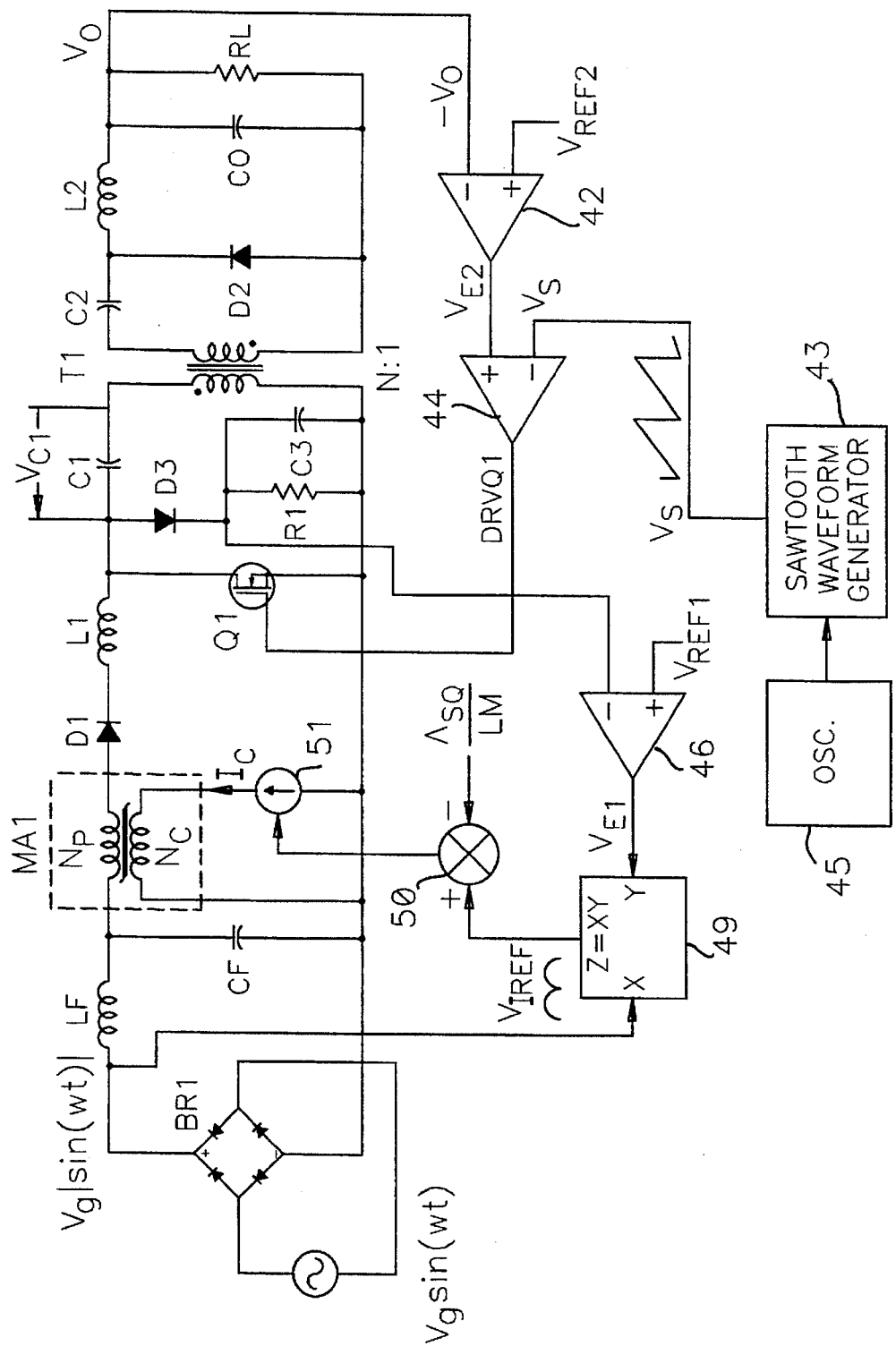
FIG. 14 is a schematic diagram of the circuit shown in FIG. 10 with a control circuit which uses current reset of the saturable inductor in the magnetic amplifier MA1 and provides automatic current shaping.

Equation (13) shows that the duty ratio $d_M$ of the magnetic amplifier is constant when the control current $I_C$ is proportional to the rectified line voltage. The second term on the right-hand side of Equation (13), $\Lambda_{SQ}/L_m$, is constant for the given core material, core geometry and number of turns. The current reset control is relatively simple and practical realization requires only analog multiplication and subtractions as shown in FIG. 14. Output voltage is regulated through a fast regulation loop comprising error amplifier 42 and comparator 44. The voltage $V_{C1}$ on the energy storage capacitor C1 is sensed using the peak detector circuit comprising the diode D3, capacitor C3 and resistor R1. Capacitor C3 is charged through diode D3 during the off interval of the switch Q1. During the conduction interval of the switch Q1, diode D3 is reverse biased and capacitor C3 is slowly discharged through the resistor R1. The time constant R1C3 is chosen long enough to filter out the switching frequency ripple component on the capacitor C3. The voltage on the capacitor C3 is compared with the reference voltage $V_{REF1}$ in the error amplifier 46. The rectified line voltage is multiplied with the error signal $V_{E1}$ from the amplifier 46 in the multiplier 49. The constant voltage proportional to $\Lambda_{SQ}/L_m$ is subtracted from the output of the multiplier 49 in an analog circuit 50, and the output of that circuit controls the current $I_C$ in a voltage controlled current source 51. The current $I_C$ is supplied to the control winding $N_c$ of the saturable inductor MA1 in order to provide proper reset and keep duty ratio $d_M$ of the magnetic amplifier constant according to Equation (13). It should be noted that when the magnetic amplifier is used there is no need for the second comparator 47 of FIG. 8 and drive circuitry as is the case when a MOSFET transistor is used to implement the switch S1. Therefore, the current reset method should be used for automatic current shaping with a magnetic amplifier due to a much simpler reset circuit than that required for the voltage reset method. This result should not be surprising because, when the current reset is used, the nonlinear dependence of the reset interval $d_RTs$ on both the line voltage and the voltage of the energy storage capacitor is eliminated by the gain of the magnetic amplifier Lm/Ts.

Figure 15:
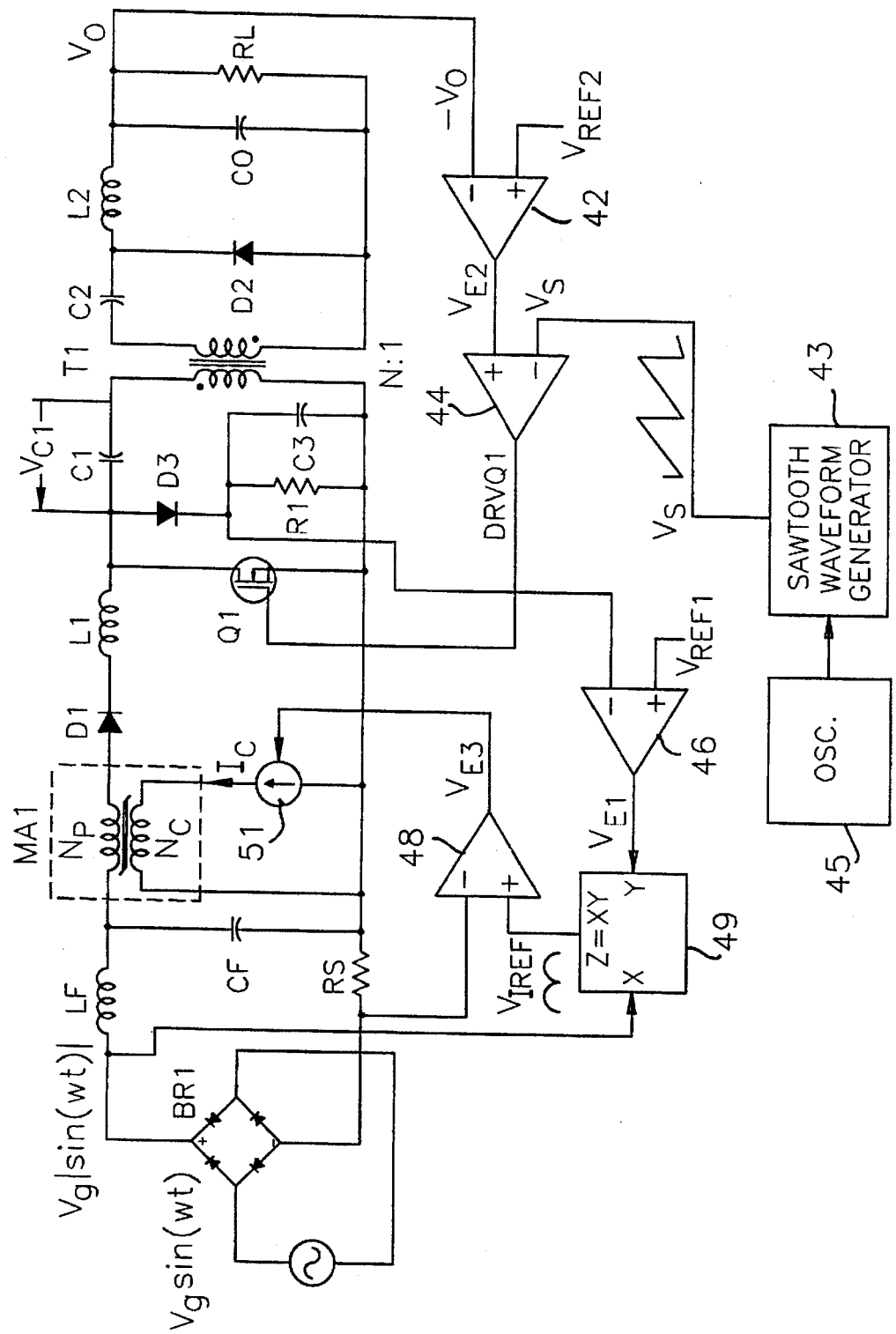
FIG. 15 is a schematic diagram of the circuit shown in FIG. 10 with an input current feedback loop for controlling the magnetic amplifier MA1 for near unity power factor operation.

Near unity power factor is achieved using a magnetic amplifier as a voltage bidirectional switch when the control circuit of FIG. 15 is used. The difference over the control circuit of FIG. 14 being that the analog circuit 50 is replaced by an error amplifier 48 of which one input $V_{IREF}$ is reference for the input current generated at the output of a multiplier 49, and second input is a voltage across the resistor RS used for sensing the rectified line current. The output $V_{E3}$ of the error amplifier 48 programs the current $I_C$ in a voltage controlled source 51, which is applied to the control winding $N_C$ of the saturable core MA1. The input current shaping is thus provided by average current mode control, while fast output regulation is provided by the same control circuit as in FIG. 14 consisting of an error amplifier 42, comparator 44, sawtooth waveform generator 43 driven by an oscillator 45. It should be mentioned that an average current mode control is mostly used for input current shapers operated in CCM as explained in L. H. Dixon, Jr., "High power factor pre-regulators for off-line power supplies," *Unitrode Power Supply Design Seminar SEM*-800, 1991, pp. 12.1–16. In the present invention, input stage of the converter which provides input current shaping by using a voltage bidirectional switch, realized preferable with a magnetic amplifier, is always operated in DICM.

There are three feedback loops in the control circuit FIG. 15: a) a fast input current loop; b) slow regulation loop of the voltage vC1 on the energy storage capacitor C1; and c) a fast output voltage regulation loop. Even though the control circuit for input current shaping in the circuit of FIG. 15 looks much the same as in FIG. 8, there is a major difference in the switch controller. The duty ratio $d_M$ of the magnetic amplifier in FIG. 15 is modulated by the reset current 16 in the control winding $N_c$ instead of by the comparator 47 of FIG. 8. Therefore, the magnetic amplifier in the current shaper of FIG. 15 combines the functions of both, a more conventional PWM modulator and a voltage bidirectional switch into a single power control component.

Extension to Other Topologies

The invention can be extended to other single-stage topologies and can be divided, according to the basic dc-to-dc converters topologies from which they are derived into two main groups: a) single-ended integrated shaper and regulator, and b) bridge topology integrated shaper and regulator. The input stage of these circuits is operated in DICM, while the output is operated in CCM. It should be noted that it is not harmful to operate the output stage in DICM, but full advantage of the low harmonic distortion in the input current due to variation in load current, particularly during step load condition, is achieved when the output stage is operated in CCM, The common feature of all of these topologies is that the voltage bidirectional switch preferably realized in practice with a magnetic amplifier is connected in the loop comprising the rectified line voltage, input inductor L1 and the active switch Q1. Also, the voltage bidirectional switch is in the loop comprising the rectified line voltage, an input inductor, an energy storage capacitor and an active switch, Another possibility is that a voltage bidirectional switch is in the loop comprising the input inductor, an energy storage capacitor and a switch. In all these cases the input stage is operated in DICM, automatic current shaping may be provided in an analogous way for each embodiment as in those described above, and an average current mode control can be used.

Single-Ended Topologies

Figure 16:
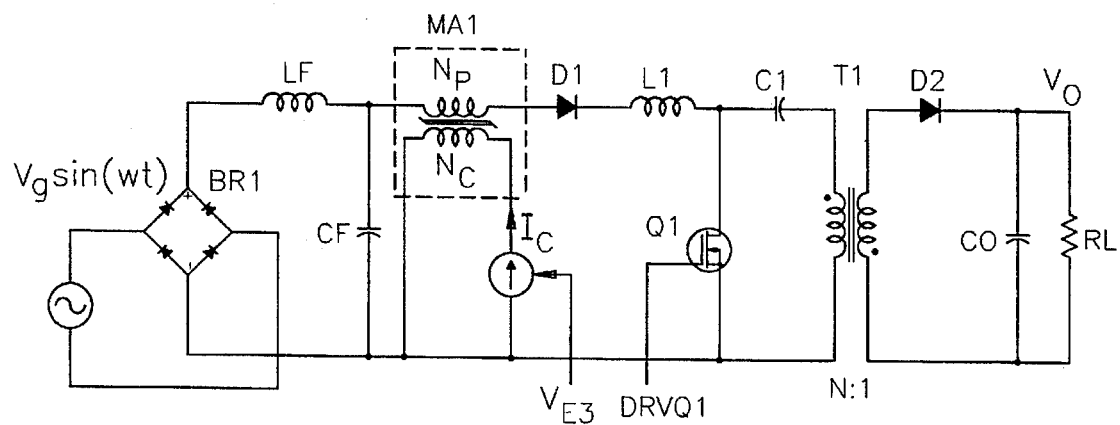
FIG. 16 is a schematic diagram of another single-stage ac-to-dc converter topology similar to that of FIG. 4 which provides input current shaping with a magnetic amplifier and fast output voltage regulation.
Figure 17:
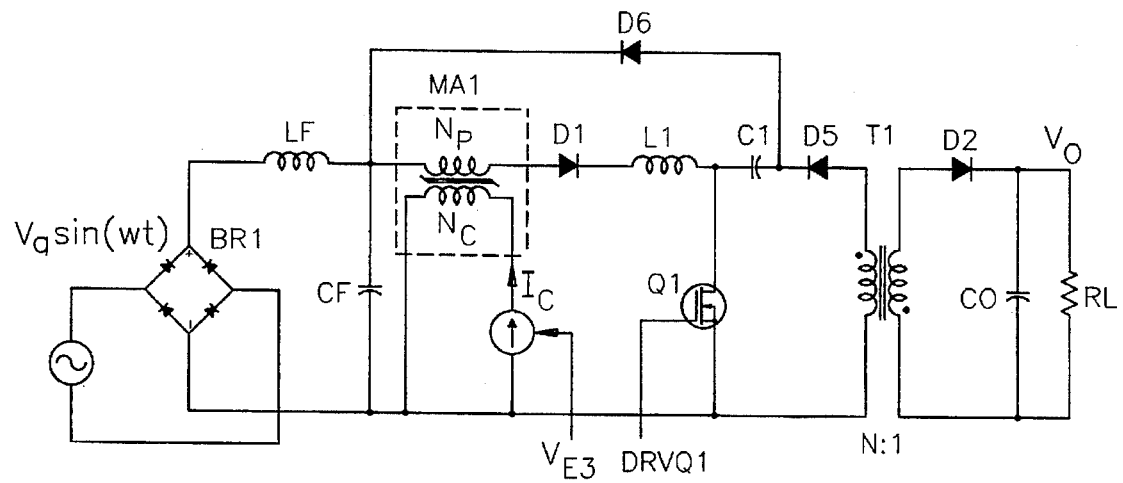
FIG. 17 illustrates a variation of the topology of FIG. 16.
Figure 18:
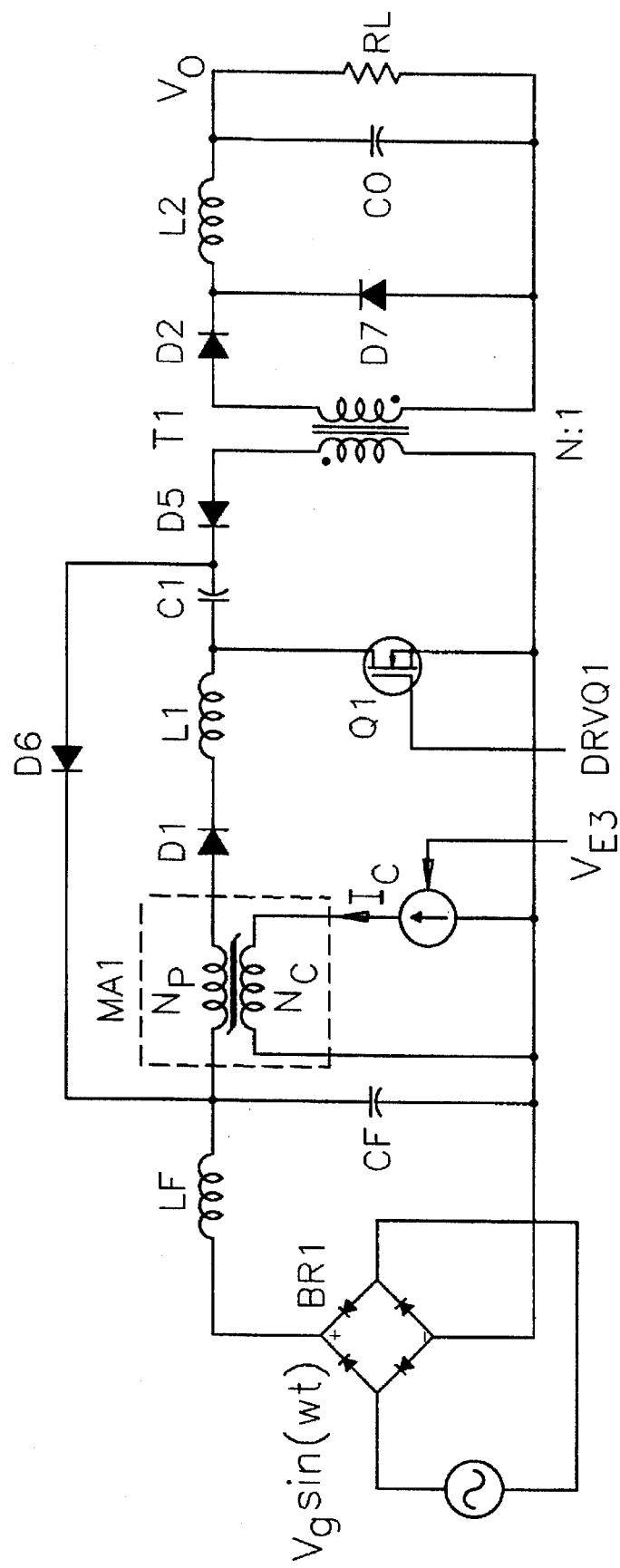
FIG. 18 illustrates a variation of the topology of FIG. 17.

Other embodiments of the present invention are shown in FIGS. 16–18. In the circuit of FIG. 16 the input stage is boost like, while the output stage is buck-boost like. In the circuits of the FIGS. 17–18 the input stage is buck-boost like so automatic current shaping will give near unity power factor regardless of the voltage on the energy storage capacitor. Also, the in-rush startup current in the circuits from FIGS. 17–18 is determined by the input filter comprising an inductor Lf and a capacitor Cf, since the energy storage capacitor is disconnected from the line by the diode D3.

Figure 19:
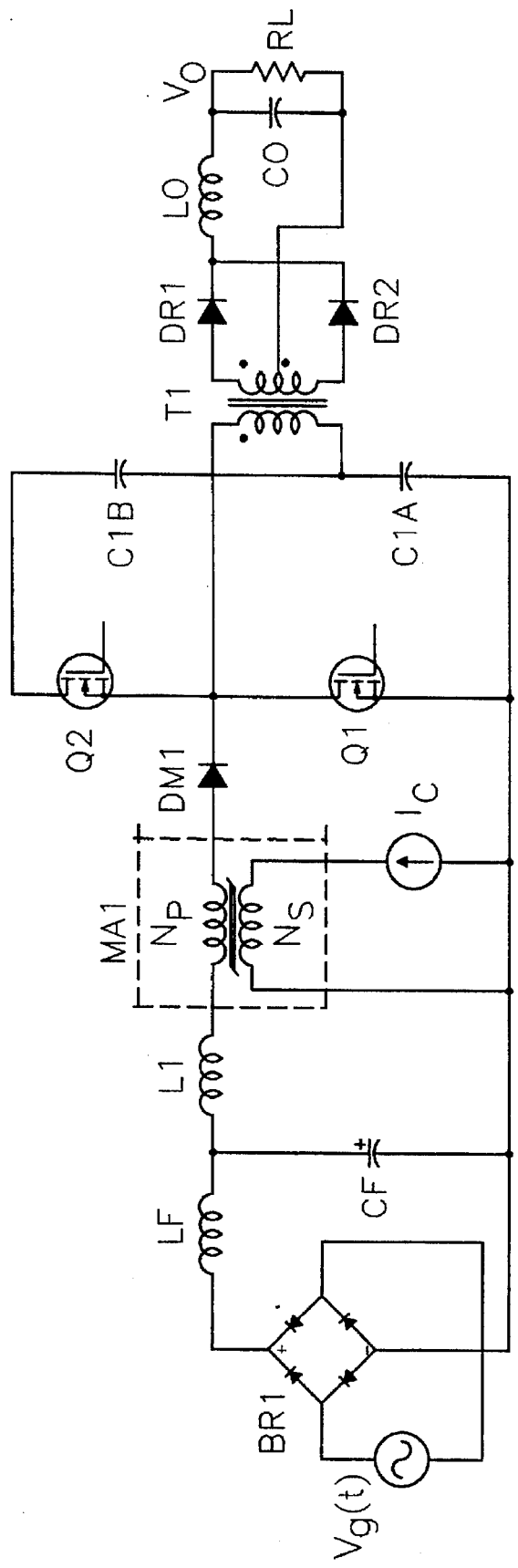
FIG. 19 is a schematic diagram of a half-bridge converter to which a basic concept of the present invention is applied with magnetic amplifiers for input current shaping.
Figure 20:
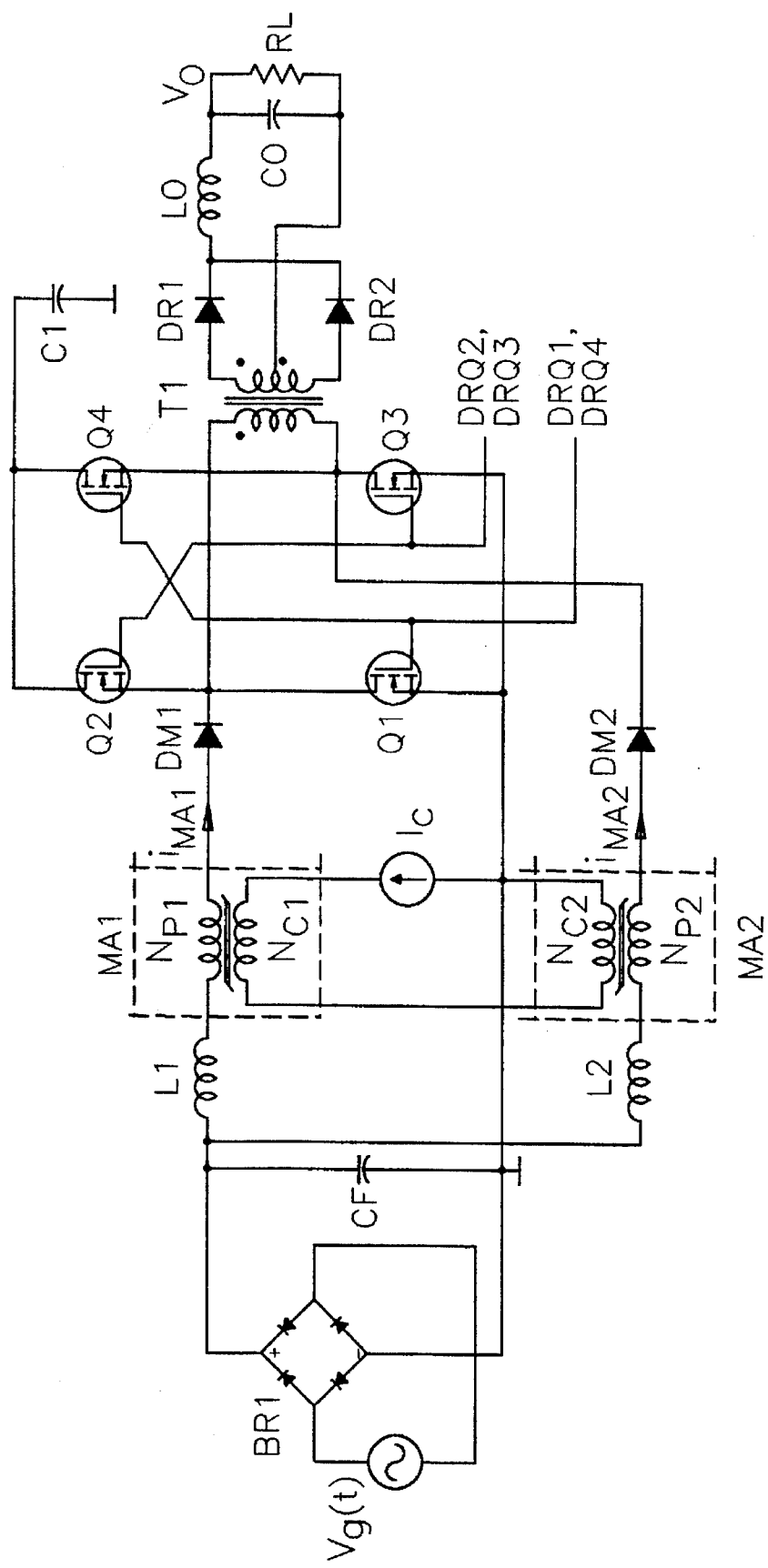
FIG. 20 is a schematic diagram of a full-bridge converter to which a basic concept of the present invention is applied with magnetic amplifiers for input current shaping.

Bridge Based Topologies Input current shaping with the magnetic amplifier can also be used in the half-bridge converter topologies as shown in FIG. 19 and the full-bridge converter topology as shown in FIG. 20. In the circuit of FIG. 19, low frequency energy is stored in capacitors C1A and C1B connected in series, while in the circuit of FIG. 20 low frequency energy is stored in capacitor C1.

Even though only one leg of the full-bridge converter can be used for input current shaping, it is advantageous to use both legs and have a magnetic amplifier and input inductor for each leg of the bridge as shown in FIG. 20. In that case, both current stress of the bridge switches and input current switching ripple are reduced compared to either single-ended and half-bridge based topologies or the full-bridge converter with a single magnetic amplifier. By proper design of the converter, it is possible to maintain continuous input current in the full bridge shaper since two legs of the bridge operate out of phase.

The principle of operation of the circuits in FIGS. 19–20 is similar to operation of the circuits from FIGS. 14–15. In addition, for the proper operation, two switches in the same leg of the bridge conduct out of phase and with no dead-time between their conduction. While the top switch in a leg of the bridge must be current bidirectional, it is advantageous to have the bottom switch in the leg of the bridge also current bidirectional in order to provide zero-voltage switching of all the switches in the bridge. There are two possible control methods of the duty ratio of the switches in the bridge:

1. The duty ratio for all switches is fixed at 50% and the output voltage is then regulated by additional switches on the secondary side, such as magnetic amplifier switches, for example.
2. The duty ratio of the switches in the same leg of the bridge is unbalanced or asymmetrical, and the output voltage regulation is provided by PWM modulation of the bridge switches.

The asymmetrical duty ratio control is preferable due to lower voltage stress on the switches in the bridge. When the asymmetrical duty ratio control is used, the voltage stress on the transistors is reduced if the bottom switch has smaller duty ratio than the upper switch in the same leg of the bridge.

In the circuit of FIG. 20 both cores of the saturable inductors, MA1 and MA2, are reset with the same current $I_C$ by connecting control windings, $N_{C1}$ and $N_{C2}$, in series.

Figure 21:
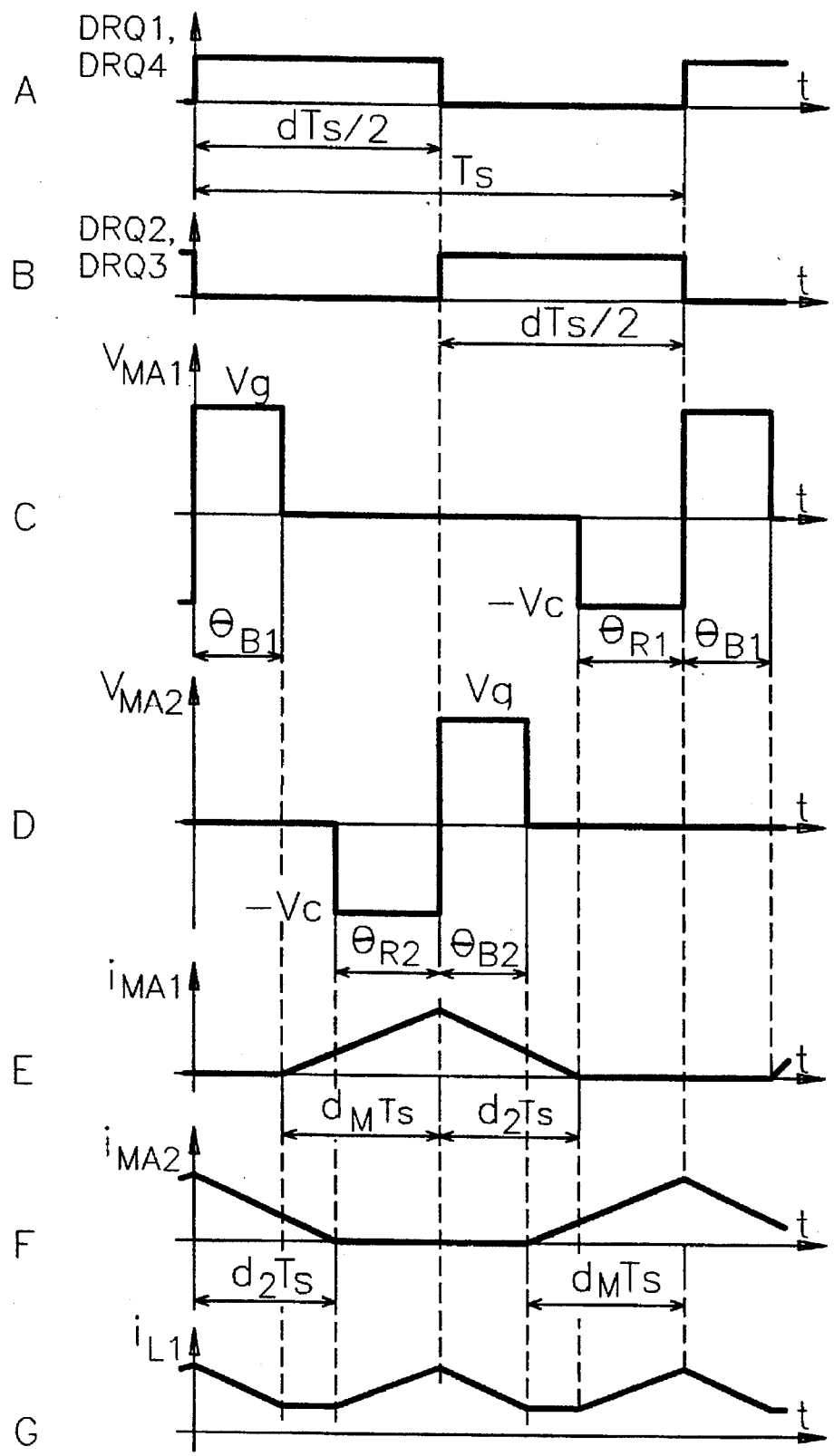
FIG. 21 is a timing diagram of waveforms in the circuit of FIG. 20 in which switches in the full bridge are all driven at a fixed 50% duty ratio during a switching period.
Figure 22:
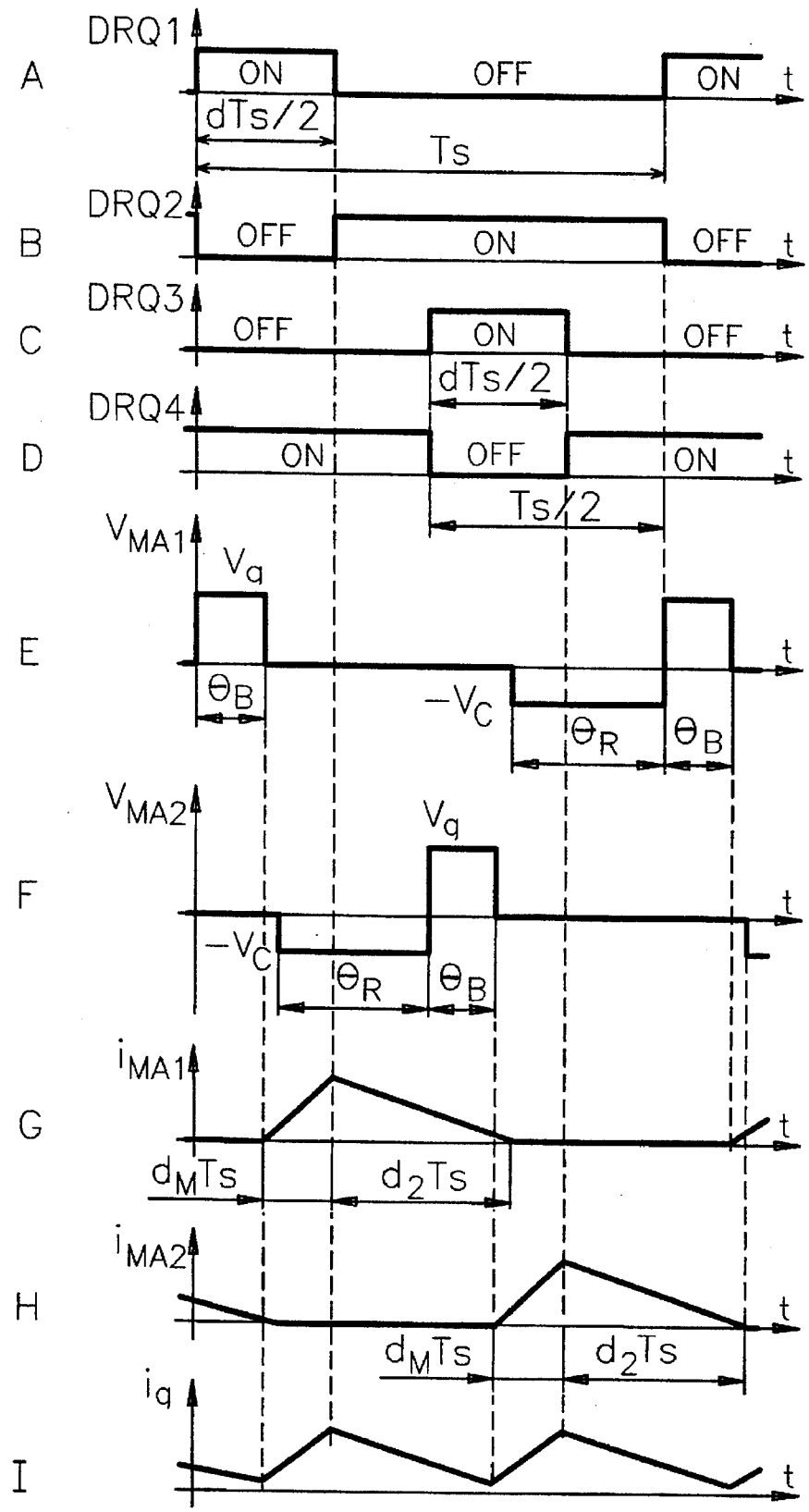
FIG. 22 is a timing diagram of waveforms in the circuit of FIG. 20 in which switches in the full bridge are driven at asymmetrical duty ratios during a switching period.

FIG. 21 shows a timing diagram in the converter of FIG. 20 during a switching period when the switches in the bridge are driven at fixed 50% duty ratio. Timing diagrams in the converter of FIG. 20 during a switching period when the switches in the bridge are driven with the asymmetrical duty ratios are shown in FIG. 22.

Conclusions Novel single-stage ac-to-dc converters are presented which exhibit high quality input current and fast output regulation. By utilizing a magnetic amplifier with a fast recovery diode in series with an input inductor operated in DICM and operating the output stage in CCM, both functions of input current shaping and regulation of the energy storage capacitor's voltage are separated from the fast output regulation provided by the transistor.

Both automatic input current shaping (voltage follower approach) and multiplier approach are possible. The current reset of the magnetic amplifier is preferable due to much simpler control circuit compared to the voltage reset method.

The input current shaping with magnetic amplifier is extended to other topologies with a single transistor and the bridge topologies. In order to keep voltage stress on the transistors in the bridge topologies, the asymmetrical duty ratio control is required.

The proposed topologies offer a low-coast alternative to the traditional two-stage solutions and also eliminates the disadvantages of other single-stage circuits.

Although particular embodiments of the invention have been described and illustrated herein, it is recognized that modifications may readily occur to those skilled in the art. Consequently, it is intended that the claims be interpreted to cover such modifications and equivalents thereof.

What is claimed is:

1. A single-stage ac-to-dc switching converter for converting ac power from a utility line source to regulated output dc voltage for powering a load comprising a single-stage dc-to-dc switching converter operated at a constant frequency connected to said load and a capacitor in parallel, said single-stage dc-to-dc switching converter having an energy storage capacitor for suppressing low frequency current at twice the frequency of said ac power, and means for regulating said output voltage to said load by modulating a duty ratio of a switching means operated at said constant frequency, thereby providing output voltage regulation independent of input voltage to said single-stage dc-to-dc converter, a bridge rectifier with lowpass filtering means connected to said utility line, a voltage bidirectional switch connected between the output of said lowpass filtering means and said single-stage dc-to-dc converter, first means for sensing voltage across said energy storage capacitor in said single-stage dc-to-dc converter stage, means for comparing said voltage sensed by said first means with a reference voltage to produce an error signal, and means responsive to said error signal for regulating said voltage across said energy storage capacitor into said single-stage dc-to-dc converter by modulating a duty ratio of said voltage bidirectional switch operated at said constant frequency.

2. A single-stage ac-to-dc converter for converting ac power from a source to regulated dc voltage for powering a load as defined in claim 1 wherein said voltage bidirectional switch comprises a MOSFET device in series with a fast recovery diode.

3. A single-stage ac-to-dc switching converter as defined in claim 1 wherein said single-stage dc-to-dc switching converter comprises an input inductor, said energy storage capacitor, an output inductor and said load connected in series, and in that order, to a return current path from said load to said bridge rectifier, and switching means for alternately connecting a first junction between said input inductor and said energy storage capacitor and a second junction between said energy storage capacitor and said output inductor to said return current path at said constant frequency with a controlled duty ratio interval of each switching cycle for connecting said first junction to said return current path, and said means for regulating said output voltage comprises a first means for comparing said output voltage with a reference voltage to produce an error signal and means responsive to said error signal for modulating said duty ratio interval of each switching cycle for connecting said first junction to said return current path.

4. A single-stage ac-to-dc switching converter as defined in claim 3 including means for automatic input current shaping comprising peak detector circuit means for sensing voltage at said first junction between said input inductor and said energy storage capacitor comprising a diode connected to charge to peak voltage a capacitor connected in series to said return current path while said dc-to-dc converter switching means is OFF to disconnect said first junction from said return current path, said peak detector capacitor having a discharge resistor connected in parallel for slow discharge of said peak detector capacitor to thereby filter out switching frequency ripple on the voltage being sensed, first means for comparing said peak voltage with a reference voltage to produce an error signal, and second means for comparing said error signal with a cyclical sawtooth waveform signal from a generator synchronized with the switching frequency cycles of said ac-to-dc converter to modulate the duty ratio of said voltage bidirectional switch while said output voltage is regulated by a separate feedback loop for synchronous control of the duty ratio of said dc-to-dc converter switching means, thereby to provide shaping of input current to follow input line voltage to said dc-to-dc converter for near unity power factor operation.

5. A single-stage ac-to-dc switching converter as defined in claim 4 including an additional fast current loop comprising means for multiplying said error signal from said means for comparing voltage sensed with rectified line voltage from said bridge rectifier to produce a product reference signal, means for sensing a voltage signal proportional to input current to said dc-to-dc converter, and means for comparing said voltage signal proportional to input current with said product reference signal for producing an error signal to said means for comparison with said cyclical sawtooth waveform from said synchronized generator, thereby achieving a very near unity power factor operation.

6. A single-stage ac-to-dc switching converter as defined in claim 3 wherein said single-stage dc-to-dc switching converter includes means for dc isolation of said load from said utility line ac power, said isolation means comprising an isolation transformer, a primary side energy storage capacitor and a secondary side energy storage capacitor in place of a single energy storage capacitor.

7. A single-stage ac-to-dc switching converter as defined in claim 6 including means for automatic input current shaping comprising peak detector circuit means for sensing voltage at a first junction between said input inductor and said primary side energy storage capacitor comprising a diode connected to charge to peak voltage a capacitor connected in series to said return current path while said switching means is OFF to disconnect said first junction from said return current path, said peak detector capacitor having a discharge resistor connected in parallel for slow discharge of said peak detector capacitor to thereby filter out switching frequency ripple on the voltage being sensed, first means for comparing said peak voltage with a reference voltage to produce an error signal, and second means for comparing said error signal with a cyclical sawtooth waveform signal from a generator synchronized with the switching frequency cycles of said ac-to-dc converter to modulate the duty ratio of said voltage bidirectional switch while said output voltage is regulated by a separate feedback loop for synchronous control of the duty ratio of said dc-to-dc converter switching means for input current shaping to follow input voltage to said dc-to-dc converter for near unity power factor.

8. A single-state ac-to-dc switching converter as defined in claim 7 including an additional fast current loop comprising means for multiplying said error signal from said first comparator with rectified line voltage from said bridge rectifier to produce a product reference signal, means for sensing a voltage signal proportional to input current to said dc-to-dc converter, and a third means for comparing said voltage signal proportional to input current with said product reference signal for producing an error signal input to said second means for comparison with said cyclical sawtooth waveform from said synchronized generator, thereby achieving a very near unity power factor operation.

9. A single-stage ac-to-dc switching converter as defined in claim 3 wherein said voltage bidirectional switch comprises a magnetic amplifier having a primary coil in series with a fast recovery diode and a control coil wound on a saturable core to form a controlled saturable inductor for conducting unidirectional current during said duty ratio of said voltage bidirectional switch, and said control coil being connected to said means responsive to said error signal for modulating said duty ratio of said voltage bidirectional switch to regulate voltage across said energy transfer capacitor.

10. A single-stage ac-to-dc switching converter as defined in claim 9 including means for automatic input current shaping comprising peak detector circuit means for sensing voltage at said first junction between said input inductor and said energy transfer capacitor comprising a diode connected to charge a capacitor connected in series to said return current path to peak voltage while said dc-to-dc converter switching means is OFF to disconnect said first junction from said return current path by said switching means, said peak detector capacitor having a discharge resistor connected in parallel for slow discharge of said peak detector capacitor to thereby filter out switching frequency ripple on the peak voltage signal being produced, first means for comparing said peak voltage signal with a reference signal to produce an error signal, means for multiplying said error signal from said means for comparing said peak voltage signal with said reference signal by a rectified line voltage signal from said bridge rectifier to produce a product reference signal, means for subtracting from said product reference signal a constant voltage proportional to $\Lambda_{sq}/L_m$ known for a given core material, core geometry and number of turns of said control coil, and a voltage controlled current source responsive to the voltage difference output signal of said subtracting means for producing a reset control current $I_C$ connected to said control coil of said magnetic amplifier.

11. A single-stage ac-to-dc switching converter as defined in claim 10 including an additional fast current loop comprising means for multiplying said error signal from said means for comparing said peak voltage signal with said reference signal by a rectified line voltage signal from said bridge rectifier to produce a voltage signal proportional to the product of said multiplying means, means for sensing a voltage signal proportional to input current to said dc-to-dc converter, means for comparing said voltage signal proportional to input current with said voltage signal proportional to said product for producing a voltage difference control signal proportional to the difference of voltage signals compared, and a voltage controlled current source responsive to said voltage difference control signal for producing a reset control current $I_C$ connected to said control coil of said magnetic amplifier, thereby achieving a very near unity power factor operation.

12. A single-stage ac-to-dc switching converter as defined in claim 1 wherein said single-stage dc-to-dc switching converter comprises an isolation transformer having on the primary side thereof an input inductor and an energy storage capacitor connected in series with the primary winding of said transformer to a return current path to said bridge rectifier, and switching means connected at one end thereof to a junction between said input inductor and said energy storage capacitor and at the other end to said return current path for alternately connecting and disconnecting said junction to said return current path at said constant frequency with a controlled duty ratio interval of each switching cycle for connecting said junction to said return current path, and having on the secondary side thereof a diode in series with said return current path, and said means for regulating said output voltage comprises a first means for comparing said output voltage with a reference voltage to produce an error signal and means responsive to said error signal for modulating said duty ratio interval of each switching cycle for connecting said first junction to said return current path.

13. A single-stage ac-to-dc switching converter as defined in claim 12 wherein said voltage bidirectional switch comprises a magnetic amplifier having a primary coil in series with said fast recovery diode and a control coil wound on a saturable core to form a controlled saturable inductor for conducting unidirectional current during said duty ratio of said voltage bidirectional switch, and said control coil being connected to said means responsive to said error signal for modulating said duty ratio of said voltage bidirectional switch to regulate input voltage to said single-stage dc-to-dc converter, and including means for automatic input current shaping comprising peak detector circuit means for sensing voltage at said junction between said input inductor and said energy storage capacitor comprising a diode connected to charge to peak voltage a capacitor connected in series to said return current path while said dc-to-dc converter switching means is OFF to disconnect said junction from said return current path, first means for comparing said peak voltage signal with a reference signal to produce an error signal, means for multiplying said error signal from said means for comparing said peak voltage signal with said reference signal by a rectified line voltage signal from said bridge rectifier to produce a product reference signal, means for subtracting from said product reference signal a constant voltage proportional to $\Lambda_{sq}L_m$ known for a given core material, core geometry and number of turns of said control coil, and a voltage controlled current source responsive to the voltage difference output signal of said subtracting means for producing a reset control current $I_C$ connected to said control coil of said magnetic amplifier.

14. A single-stage ac-to-dc switching converter as defined in claim 13 including an additional fast current loop comprising means for multiplying said error signal from said means for comparing voltage sensed with rectified line voltage from said bridge rectifier to produce a product reference signal, means for sensing a voltage signal proportional to input current to said dc-to-dc converter, means for comparing said voltage signal proportional to input current with said voltage signal proportional to said product for producing a voltage difference control signal proportional to the difference of voltage signals compared, and a voltage controlled current source responsive to said voltage difference control signal for producing a reset control current $I_C$ connected to said control coil of said magnetic amplifier, thereby achieving a very near unity power factor operation.

15. A single-stage ac-to-dc switching converter as defined in claim 13 including a first additional diode in series between said primary winding and said energy storage capacitor and a second additional diode connected from a junction between said energy storage capacitor and said first additional diode to a junction between said lowpass filter and said magnetic amplifier, whereby automatic current shaping will be achieved with near unity power factor regardless of the voltage on said series capacitor and during the in-rush startup period current in the converter circuits is determined by said lowpass filter at the output of said bridge rectifier.

16. A single-stage ac-to-dc switching converter as defined in claim 15 including on the secondary side of said isolation transformer an output inductor in series between said diode and load and an additional diode connected at one end to a junction between said series inductor and diode and at the other end thereof to the return current path of said load.

17. A single-stage ac-to-dc switching converter as defined in claim 1 wherein said single-stage dc-to-dc switching converter comprises an isolation transformer having on the primary side thereof a half switching bridge having one switch in a leg connected between one of the primary winding of the transformer and a return current path to said bridge rectifier and another switch in a leg connected at one end to said one end of said primary winding and the other end connected to a first energy storage capacitor in a third leg connected to the other end of said primary winding, and a second energy storage capacitor closing the bridge between said other end of said primary winding and having on the secondary side a center tap on the secondary winding connected to the return current path of said load and two diodes, a separate one connecting a separate end of said secondary winding to a lowpass filter coupling to said load, said two switches on the primary side being driven out-of-phase and said two diodes on the secondary side operating automatically, wherein said voltage bidirectional switch comprises a magnetic amplifier having a primary coil in series with said fast recovery diode and a control coil wound on a saturable core to form a controlled saturable inductor for conducting unidirectional current during said duty ratio of said voltage bidirectional switch, and said control coil being connected to said means responsive to said error signal for modulating said duty ratio of said voltage bidirectional switch to regulate input voltage to said single-stage dc-to-dc converter, including means for automatic current shaping comprising peak detector circuit means for sensing voltage across said first and second capacitors connected in series, first means for comparing said voltage with a reference voltage to produce an error signal, means for multiplying said error signal from said means for comparing said peak voltage signal with said reference signal by a rectified line voltage signal from said bridge rectifier to produce a product reference signal, means for subtracting from said product reference signal a constant voltage proportional to $\Lambda_{sq}/L_m$ known for a given core material, core geometry and number of turns of said control coil, and a voltage controlled current source responsive to the voltage difference output signal of said subtracting means for producing a reset control current $I_C$ connected to said control coil of said magnetic amplifier.

18. A single-stage ac-to-dc switching converter as defined in claim 1 wherein said single-stage dc-to-dc switching converter comprises an isolation transformer having on the primary side thereof a half switching bridge having one switch in a leg connected between one of the primary winding of the transformer and a return current path to said bridge rectifier and another switch in a leg connected at one end to said one end of said primary winding and the other end connected to a first energy storage capacitor in a third leg connected to the other end of said primary winding, and a second energy storage capacitor closing the bridge between said other end of said primary winding and having on the secondary side a center tap on the secondary winding connected to the return current path of said load and two diodes, a separate one connecting a separate end of said secondary winding to a lowpass filter coupling to said load, said two switches on the primary side being driven out-of-phase and said two diodes on the secondary side operating automatically, wherein said voltage bidirectional switch comprises a magnetic amplifier having a primary coil in series with said fast recovery diode and a control coil wound on a saturable core to form a controlled saturable inductor for conducting unidirectional current during said duty ratio of said voltage bidirectional switch, and said control coil being connected to said means responsive to said error signal for modulating said duty ratio of said voltage bidirectional switch to regulate input voltage to said single-stage dc-to-dc converter, means for comparing said voltage signal proportional to input current with said voltage signal proportional to said product for producing a voltage difference control signal proportional to the difference of voltage signals compared, and a voltage controlled current source responsive to said voltage difference control signal for producing a reset control current $I_C$ connected to said control coil of said magnetic amplifier, thereby achieving a very near unity power factor operation.

* * * * *